United States Patent
Hoppe et al.

(10) Patent No.: US 7,872,648 B2
(45) Date of Patent: Jan. 18, 2011

(54) RANDOM-ACCESS VECTOR GRAPHICS

(75) Inventors: Hugues Hoppe, Redmond, WA (US); Diego Fernandes Nehab, Rio de Janeiro (BR)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/763,322

(22) Filed: Jun. 14, 2007

(65) Prior Publication Data

US 2008/0309676 A1    Dec. 18, 2008

(51) Int. Cl.
G06T 11/40    (2006.01)
G06T 15/40    (2006.01)
G06T 9/00     (2006.01)
G06K 9/36     (2006.01)
G06K 9/54     (2006.01)
G06K 9/00     (2006.01)
G06F 9/34     (2006.01)

(52) U.S. Cl. .................. 345/423; 345/552; 345/555; 382/232; 382/253; 382/305; 382/282; 711/216

(58) Field of Classification Search .......... 345/418–423, 345/581–582, 552, 555, 545, 546, 567, 611–612; 358/539, 461; 382/232–233, 246, 253, 254, 382/266, 269, 274, 282, 285, 302, 305; 711/216
See application file for complete search history.

(56) References Cited

U.S. PATENT DOCUMENTS

| 5,490,258 A | 2/1996 | Fenner |
| 5,526,504 A | 6/1996 | Hsu |
| 5,692,177 A | 11/1997 | Miller |
| 5,893,086 A | 4/1999 | Schmuck |
| 6,014,733 A | 1/2000 | Bennett |
| 6,654,868 B2 | 11/2003 | Tamatsu |
| 6,765,584 B1 | 7/2004 | Wloka |
| 6,795,080 B2 | 9/2004 | Lavelle |
| 6,873,343 B2 | 3/2005 | Chui |
| 7,158,141 B2 | 1/2007 | Chung |
| 2004/0064483 A1 | 4/2004 | Bulka et al. |
| 2004/0117600 A1 | 6/2004 | Bodas et al. |
| 2004/0227767 A1 | 11/2004 | Baroncelli et al. |

(Continued)

OTHER PUBLICATIONS

Benson, D., and J. Davis, Octree textures, SIGGRAPH '02, 2002, pp. 785-790.

(Continued)

*Primary Examiner*—Wesner Sajous
(74) *Attorney, Agent, or Firm*—Lyon & Harr, LLP; Mark A. Watson

(57) ABSTRACT

A "Vector Graphics Encoder" encodes vector graphics in a randomly accessible format. This encoding format enables particular portions of encoded images to be directly accessed, at any desired level of zoom, without processing or otherwise decoding the entire image. This random-access format is based on a coarse image grid of partially overlapping cells wherein each cell is defined by a "texel program." Unlike fixed-complexity cells used by conventional vector images, each cell defined by a texel program is locally specialized without requiring global constraints on the complexity of each cell. The texel program for each cell is provided as a variable-length string of tokens representing a locally specialized description of one or more of layers of graphics primitives overlapping the cell. Images are then rendered by interpreting the texel programs defining one or more cells.

20 Claims, 9 Drawing Sheets

U.S. PATENT DOCUMENTS

| | | | |
|---|---|---|---|
| 2005/0063596 A1* | 3/2005 | Yomdin et al. | 382/232 |
| 2005/0219624 A1 | 10/2005 | Zavitaev | |
| 2006/0044317 A1 | 3/2006 | Bourd et al. | |
| 2006/0103665 A1 | 5/2006 | Opala et al. | |
| 2008/0309676 A1* | 12/2008 | Nehab et al. | 345/582 |

OTHER PUBLICATIONS

Blinn, J., How to solve a cubic equation, Part 2: The 11 Case, IEEE CG&A, 2006, vol. 26, No. 4, pp. 90-100.

Blythe, D., The Direct3D 10 system, Proc. of ACM SIGGRAPH HDR and systems, Jul. 2006, pp. 724-734, vol. 25, No. 3.

Brain, M., and A. Tharp, Perfect hashing using sparse matrix packing, Info. Sys., 1990, pp. 281-290, vol. 15, No. 3.

Cantlay, I. Mipmap-level measurement. GPU Gems II, 2005, pp. 437-449.

Carpenter, L., The A-buffer, an antialiased hidden surface method, ACM SIGGRAPH, 1984, pp. 103-108.

Czech, Z., G. Havas, and B. Majewski, Perfect hashing, Theoretical Computer Science 1997, pp. 1-143, vol. 182.

Debry, D., J. Gibbs, D. Petty, and N. Robins, Painting and rendering on unparameterized models. ACM SIGGRAPH, 2002, pp. 763-768.

Fox, E., L. Heath, Q. Chen, and A. Daoud, Practical minimal perfect hash functions for large databases, 1992, CACM, pp. 105-121, vol. 33, No. 1.

Fredman, M. L., J. Komlós, E. Szemerédi, Storing a sparse table with 0(1) worst case access time, J. of the ACM (JACM), Jul. 1984, pp. 538-544, vol. 31, No. 3.

Frisken, S., R. Perry, A. Rockwood, and T. Jones, Adaptively sampled distance fields: A general representation of shape for computer graphics, ACM SIGGRAPH, 2000, pp. 249-254.

Gaede, V., and O. Günther, Multidimensional access methods, ACM Computing Surveys, 1998, vol. 30, No. 2, pp. 170-231.

Goldman, R., T. Sederberg, and D. Anderson, Vector elimination: A technique for the implicitization, inversion, and intersection of planar parametric rational polynomial curves, CAGD, 1984, vol. 1, pp. 327-356.

Govindaraju, N., M. Lin, and D. Manocha, Fast and reliable collision culling using graphics hardware, Proc. of VRST, 2004, pp. 2-9.

Greiner, G., and K. Hormann, Efficient dipping of arbitrary polygons, ACM TOG, 1998, pp. 71-83, vol. 17, No. 2.

Heckbert, P., Fundamentals of texture mapping and image warping, M.S. Thesis, 1989, UC Berkeley, Dept. Of EECS.

Ho, Y., Application of minimal perfect hashing in main memory indexing, 1994, Masters Thesis, MIT.

Houston, B., M. B. Nielsen, C. Batty, O. Nilsson, K. Museth, Hierarchical RLE level set: A compact and versatile deformable surface representation, ACM Transactions on Graphics (TOG) Jan. 2006, pp. 151-175, vol. 25, No. 1.

Kraus, M., and T. Ertl, Adaptive texture maps, Graphics Hardware, 2002, pp. 7-15.

Lefebvre, S., H. Hoppe, Perfect spatial hashing, Int'l Conf. on Comp. Graphics and Interactive Techniques, 2006, pp. 579-588, Boston, Massachusetts.

Lefebvre, S., S. Hornus, and F. Neyret, Octree textures on the GPU, GPU Gems II, 2005, pp. 595-613.

Lefebvre, S., and F. Neyret, Pattern based procedural textures, Symposium on Interactive 3D Graphics, 2003, pp. 203-212.

Lefohn, A. E., S. Sengupta, J. Kniss, R. Strzodka, and J. D. Owens, Glift: Generic, efficient, random-access GPU data structures, ACM Transactions on Graphics (TOG), Jan. 2006, pp. 60-99, vol. 25, No. 1.

Loop, C., and J. Blinn, Resolution-independent curve rendering using programmable graphics hardware. ACM SIGGRAPH, 2005, 1000-1009.

Loviscach, J., Efficient magnification of bi-level textures, Int'l Conf. on Comp. Graphics and Interactive Techniques, ACM SIGGRAPH 2005.

Mehlhorn, K. 1982. On the program size of perfect and universal hash functions. Symposium on Foundations of Computer Science, 170-175.

Mirtich, B. 1996. Impulse-based dynamic simulation of rigid body systems. PhD Thesis, UC Berkeley.

Naor, M. and V. Teague, Anti-persistence: History independent data structures, Proc. 33rd ACM Symp. on Theory of Computing, 2001.

Östlin, A., and Pagh, R. 2003. Uniform hashing in constant time and linear space. ACM STOC, 622-628.

Pearson, P. K., Fast hashing of variable-length text strings, Communications of the ACM, Jun. 1990, pp. 677-680, vol. 33, No. 6.

Peercy, M., Olano, M., Airey, J., and Ungar, J. 2000. Interactive multi-pass programmable shading. ACM SIGGRAPH, 425-432.

Qin, Z., McCool, M., and Kaplan, C. 2006. Real-time texture-mapped vector glyphs. Symposium on Interactive 3D Graphics and Games, 125-132.

Ramanarayanan, G., Bala, K., and Walter, B. 2004. Feature-based textures. Eurographics Symposium on Rendering, 65-73.

Ray, N., Cavin, X., and Lévy, B. 2005. Vector texture maps on the GPU. Technical Report ALICE-TR-05-003.

Sager, T. 1985, A polynomial time generator for minimal perfect hash functions, CACM, 1985, pp. 523-532, vol. 28, No. 5.

Schmidt, J., and Siegel, A. 1990. The spatial complexity of oblivious k-probe hash functions, SIAM Journal on Computing, 19(5), 775-786.

Sen, P., Cammarano, M., and Hanrahan, P. 2003. Shadow silhouette maps. ACM SIGGRAPH, 521-526.

Sen, P., Silhouette maps for improved texture magnification, Symposium on Graphics Hardware, 2004, pp. 65-73.

Sutherland, I., and G. Hodgman, Reentrant polygon clipping, Communications of the ACM, 1974, pp. 32-42, vol. 17, No. 1.

Tarini, M., and P. Cignoni, Pinchmaps: Textures with customizable discontinuities, Eurographics Conf., 2005, pp. 557-568.

Teschner, M., B. Heidelberger, M. Müller, D. Pomeranets, and M. Gross, Optimized spatial hashing for collision detection of deformable objects, Proc. VMV, 2003, pp. 47-54.

Tumblin, J., and P. Choudhury, Bixels: Picture samples with sharp embedded boundaries, Symposium on Rendering, 2004, pp. 186-194.

Warnock, J., A hidden surface algorithm for computer generated halftone pictures, PhD Thesis, 1969, University of Utah.

Weiler, M., M. Kraus, M. Merz, and T. Ertl, Hardware-based ray casting for tetrahedral meshes, Proc. of the 14th IEEE Visualization 2003 (VIS'03), 2003, pp. 333-340.

Winner, S., M. Kelley, B. Pease, B. Rivard, and A. Yen, Hardware accelerated rendering of antialiasing using a modified A-buffer algorithm, ACM SIGGRAPH, 1997, pp. 307-316.

Winters, V., Minimal perfect hashing in polynomial time, BIT, 1990, vol. 30, No. 2, pp. 235-244.

Zobel, J., A. Moffat, and R. Sacks-Davis, Storage management for files of dynamic records, Proc. of the 4th Australian Database Conf., 1993, pp. 26-38.

* cited by examiner

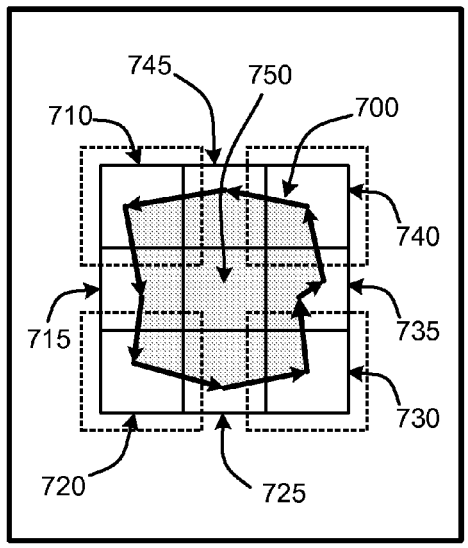
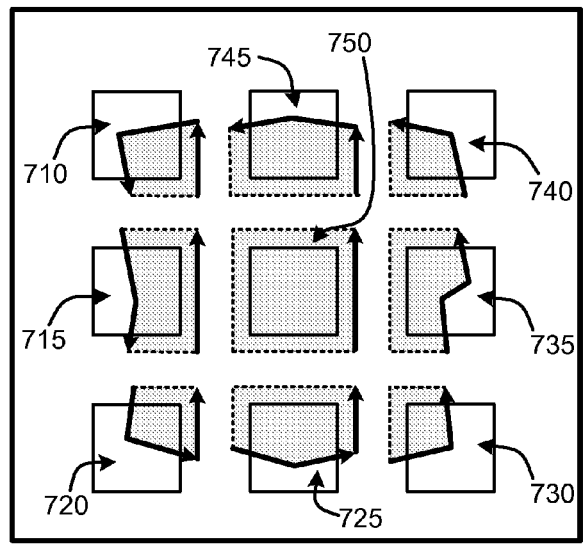
FIG. 7      FIG. 8
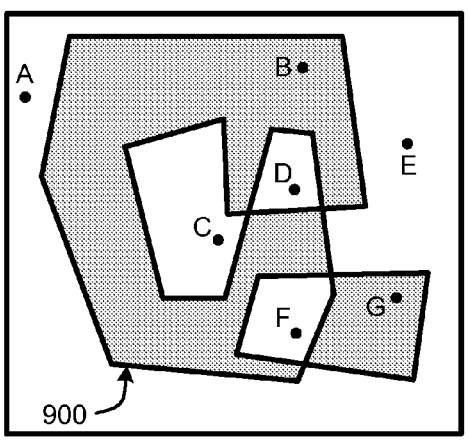
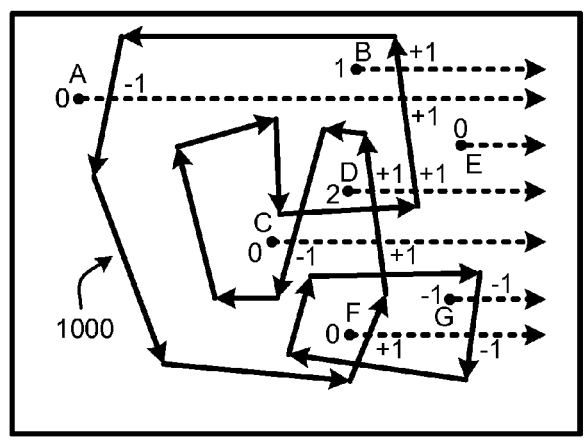
FIG. 9      FIG. 10

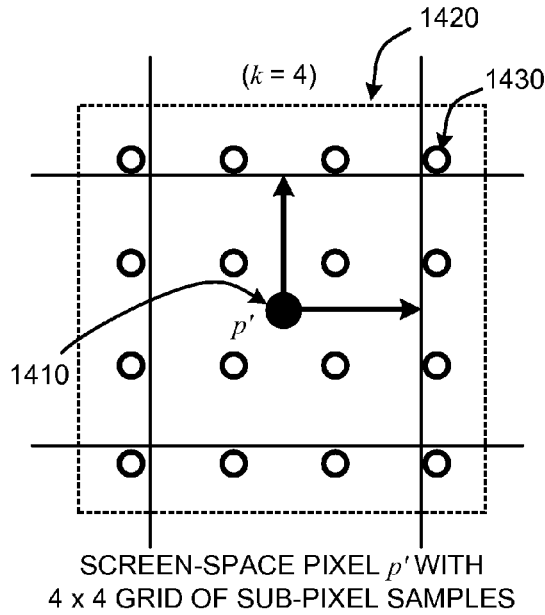
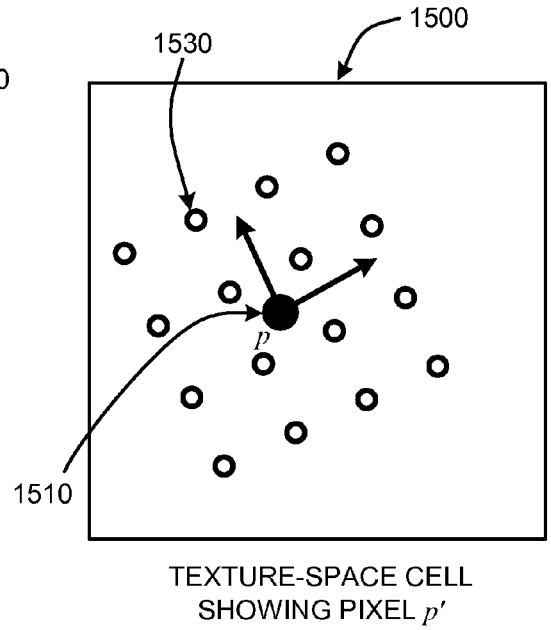
SCREEN-SPACE PIXEL p' WITH
4 x 4 GRID OF SUB-PIXEL SAMPLES
FIG. 14
TEXTURE-SPACE CELL
SHOWING PIXEL p'
FIG. 15
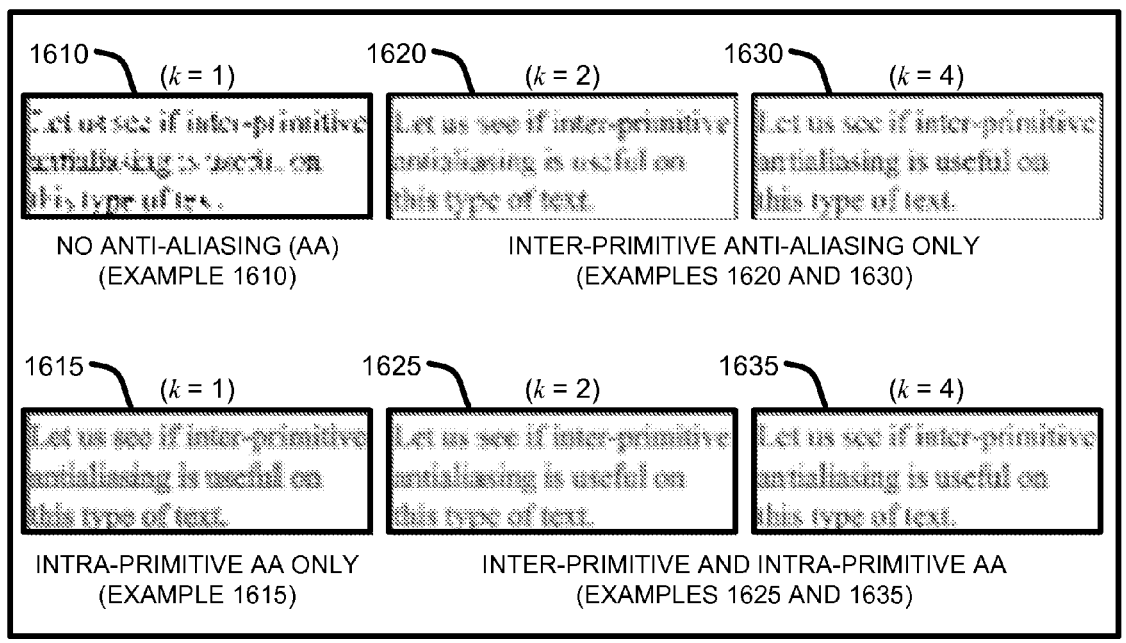
FIG. 16

RANDOM-ACCESS VECTOR GRAPHICS

BACKGROUND

1. Technical Field

The invention is related to vector graphics, and in particular, to locally specializing vector graphics descriptions to overlapping grid cells of arbitrary complexity by constructing layered cell-based "texel programs" for use in providing efficient random-access of vector images.

2. Related Art

Vector graphics, including filled shapes and stroke outlines, are often used for symbolic information such as text, illustrations, and maps. Well known examples of vector graphics formats include the portable document format (pdf) (e.g., Adobe® Acrobat® files), the Microsoft® Windows® Metafile (WMF), and scalable vector graphics (SVG). Typically, evaluating an individual pixel within a vector graphics object requires traversing all its primitives. Consequently, such objects are generally rendered by rasterizing each primitive in a frame-buffer, e.g. with a scanline algorithm.

In contrast, raster images offer efficient random-access evaluation at any point by simple filtering of a local pixel neighborhood. Such random access allows images to be texture-mapped onto arbitrary surfaces, and permits efficient magnification and minification. However, images do not accurately represent sharp color discontinuities such as symbolic outlines. Thus, as one zooms in on a discontinuity, image magnification reveals a blurred boundary.

In order to provide some of the benefits of vector graphics to raster images, the concept of "vector images" has been developed. For example, conventional vector images support sharp outlines within raster images by adding to each pixel a local approximation of the outline geometry. Typical vector image schemes allocate uniform memory to all pixels by bounding the outline complexity in each pixel neighborhood, giving such cells a fixed-complexity. Unfortunately, general vector graphics with overlapping primitives of different colors cannot be represented efficiently using conventional vector images.

In particular, vector images incorporate sharp outlines within a color image by encoding extra information in its pixels. Typical vector image schemes enforce a bound on the outline complexity within each image cell, such as two line segments, implicit bilinear curves, parametric cubic curves, 2-4 corner features, etc. Unfortunately, one disadvantage of the fixed-complexity cells used by vector images is that small areas of high detail (such as serifs on a font glyph or cities on a map) require finer cell grids, which globally increases storage cost since there are more cells, and all cells will have the same fixed complexity regardless of content. This problem has been partially addressed by using quad-tree structures to provide better adaptivity. Unfortunately, such schemes still limit the number of primitives that can be represented at the leaf nodes of the vector image.

Further, typical vector image schemes generally consider only a single layer of non-overlapping vector primitives. One generalization to this basic premise is to construct a compositing hierarchy of several vector images. However, on general graphics models, a global compositing hierarchy tends to quickly become overly complex with the cost applying uniformly to all pixels. More advanced approaches to vector images include using either multi-linear implicit approximants or recording oriented corner features for computing a signed distance to the shape primitives, thereby enabling screen-space anti-aliasing of the vector images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Vector Graphics Encoder," as described herein, provides a process for encoding vector graphics in a randomly accessible format by creating a coarse image grid of overlapping cells in which each image cell is defined by a "texel program." The texel program for each cell represents a locally specialized description of graphics primitives, such as, for example, strokes, filled shapes, alpha values, etc., overlapping the cell. Once a vector graphic image has been encoded into cell-based texel programs, the encoded vector graphic image (i.e., the collection of cell-based texel programs) is then stored for later use. When rendering the encoded vector graphic image, the texel programs corresponding to the cells covering some region of interest of the image (i.e., all or part of the image) are then interpreted at runtime to provide random access to the vector graphic image at any desired level of zoom. In one embodiment, rendering is performed within a programmable pixel shader of a graphics processing unit (GPU).

In particular, the Vector Graphics Encoder provides a random-access representation for general vector graphics with arbitrary colored layers of filled and outlined shapes. This capability is based on the idea of constructing a coarse image grid of overlapping cells in which each grid cell contains a local graphics description specialized to that cell. This local description is stored as a variable-length string of tokens, referred to herein as a "texel program." The texel program is then evaluated by interpreting the texel program within a programmable pixel shader at rendering time. In various embodiments, texel programs are packed into a memory buffer using either indirection tables, or a variable-size perfect hash technique. These memory packing techniques allow quicker access to specific regions of the encoded image, with small regions of the image (in the form of texel programs) being arranged into contiguous regions of memory, thereby decreasing image rendering times when providing texel programs corresponding to particular cells from the memory buffer to the GPU.

Unlike the fixed-complexity cells of conventional vector image schemes, the complexity of the texel program defining each individual cell is directly related to the number of geometric primitives overlapping the cell. Consequently, cell complexity is arbitrary, with additional complexity only being introduced where it is needed. Moreover, when rendering images, processing time in the pixel shader also adapts to this complexity (subject to local SIMD parallelism in the GPU), so that large areas of uniform color are rendered quickly.

One advantage of the texel programs enabled by the Vector Graphics Encoder is that they coherently encapsulate all the data involved in rendering a region of the image domain. Whereas conventional vector graphics rasterization would read a stream of primitives and perform overlapping scattered updates to the frame-buffer of a conventional GPU, the Vector Graphics Encoder instead caches a small string of specialized primitives, combines the primitives within the shader, and then performs a single write per pixel. Consequently, the Vector Graphics Encoder has a low-bandwidth coherent memory access that is advantageous for use with multicore CPU or GPU architectures, or other multi-threaded processors.

Another benefit provided by the texel programs of the Vector Graphics Encoder is that of efficient anti-aliasing. In particular, since texel programs provide a (conservative) list of primitives overlapping each pixel of each cell, the Vector Graphics Encoder directly evaluates an anti-aliased pixel color for the current surface in a single rendering pass, without resorting to A-buffer fragment lists. Although inter-primitive anti-aliasing adds computational cost, it involves no additional memory access. Further, super-sampling density can be spatially adapted to local geometric complexity, e.g. falling back to a single sample per pixel in regions of constant color.

Texel programs also inherit other advantages demonstrated previously with respect to vector images. For example, the geometric primitives stored in texel programs can use lower-precision (e.g. 8-bit) cell-local coordinates. Further, since the vector graphics are evaluated entirely in the shader, they can be mapped onto general surfaces just like texture images.

In view of the above summary, it is clear that the Vector Graphics Encoder described herein provides a unique system and method for defining overlapping grid cells of an image by using texel programs to provide a random-access representation for general vector graphics with arbitrary colored layers of filled and outlined shapes. In addition to the just described benefits, other advantages of the Vector Graphics Encoder will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 7 provides an illustration of extended grid cells having an overlap region extending into neighboring cells, as described herein.

FIG. 8 provides an illustration of the individual extended cells of FIG. 7 showing path segments of primitives to be defined by texel programs for representing the arbitrary filled shape for each cell, with dashed lines representing path segments having no effect on winding number, as described herein.

FIG. 9 illustrates an arbitrary self intersecting filled polygon shape within a single cell, along with a set of points {A,B,C,D,E,F,G} at various locations throughout the cell.

FIG. 10 provides an example of computing "winding numbers" for points in the cell relative to the arbitrary filled polygon shape of FIG. 9, for determining whether particular points are in the path interior, as described herein.

FIG. 14 illustrates a pixel in "screen-space" surrounded by a sub-pixel sample grid of k×k samples for use in implementing inter-primitive anti-aliasing, as described herein.

FIG. 15 illustrates a "texture-space" footprint for the "screen-space" pixel of FIG. 14 for use in implementing inter-primitive anti-aliasing, as described herein.

FIG. 16 illustrates various examples of inter-primitive anti-aliasing, with and without the use of intra-primitive anti-aliasing as applied to text samples using various sample grid sizes, as described herein; note that the text samples in this figure are not intended to be legible or readable, and are provided only for illustrating anti-aliasing effects.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
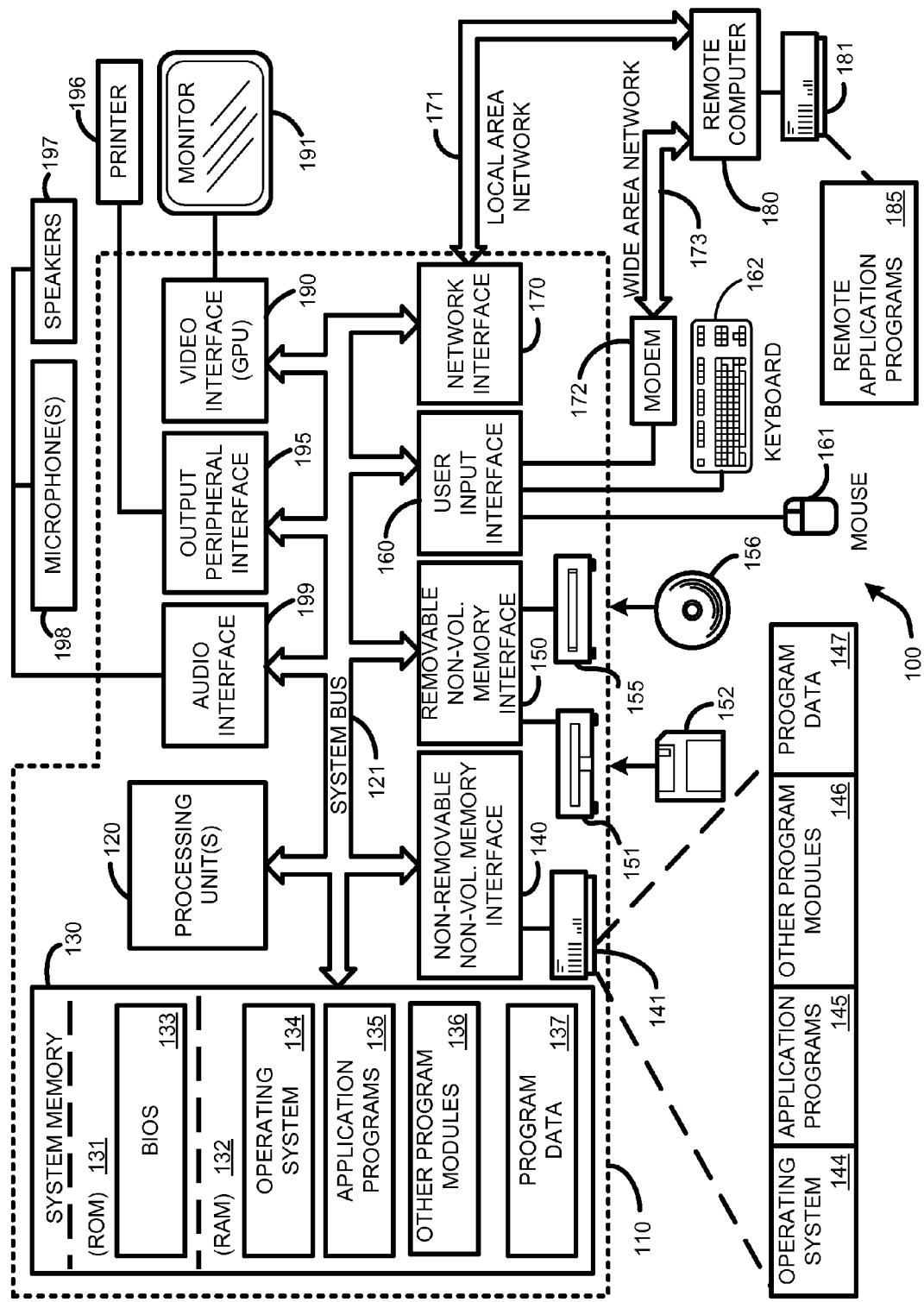
FIG. 1 is a general system diagram depicting a general-purpose computing device constituting an exemplary system for use in implementing a "Vector Graphics Encoder," as described herein.
Figure 2:
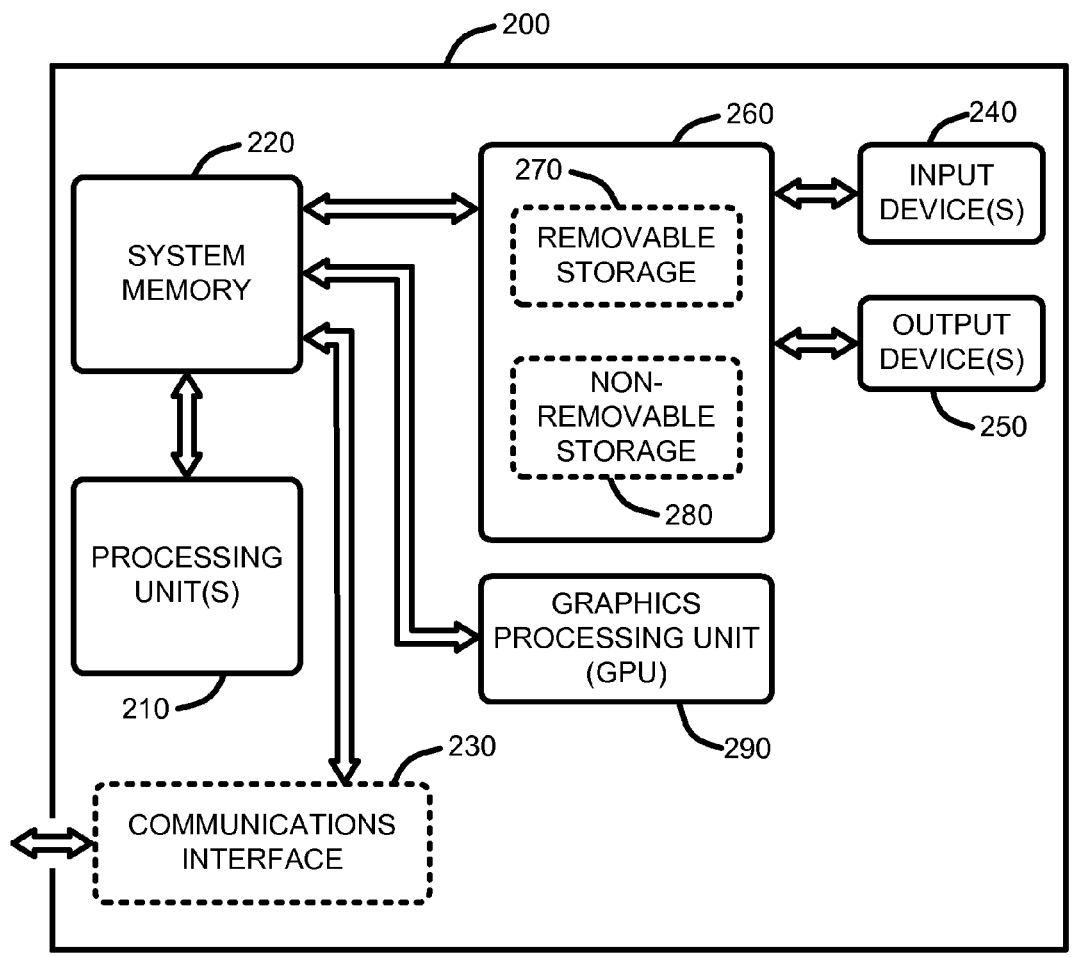
FIG. 2 is a general system diagram depicting a general device having simplified computing and I/O capabilities for use in implementing a "Vector Graphics Encoder," as described herein.

1.0 Exemplary Operating Environments:

FIG. 1 and FIG. 2 illustrate two examples of suitable computing environments on which various embodiments and elements of a "Vector Graphics Encoder," as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface or input device for receiving vector graphic images, including, for example, cell phones, PDA's, media players, etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the functionality of the Vector Graphics Encoder, the device must have some minimum computational capability, some storage capability, an interface for allowing input and encoding of vector graphic images. In addition, this simplified computing device may also include an output device for outputting or displaying renderings of encoded vector graphics.

In particular, as illustrated by FIG. 2, the computational capability is generally illustrated by processing unit(s) 210 (roughly analogous to processing units 120 described above with respect to FIG. 1). Further, the simplified computing device of FIG. 2 may also include a graphics processing unit (GPU) 290 for use in accelerating rendering of vector graphic images. Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other microcontroller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). The simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Vector Graphics Encoder" which defines overlapping grid cells of an image by using texel programs to provide a random-access representation for general vector graphics with arbitrary colored layers of filled and outlined shapes.

2.0 Introduction:

In general, a "Vector Graphics Encoder," as described herein, provides a process for encoding vector graphics in a randomly accessible format. In other words, the encoding format provided by the Vector Graphics Encoder enables particular portions of an encoded image to be directly accessed without processing or otherwise decoding the entire image. This random-access format is based on a coarse image grid of partially overlapping cells in which each image cell is defined by a "texel program." Further, unlike the fixed-complexity cells used by conventional vector images, each cell defined by the texel program of the Vector Graphics Encoder is locally specialized such that there is no global constraint on the complexity of each cell. In other words, each individual cell defined by a texel program can have any desired level of complexity. In addition, the random access data structure provided by the Vector Graphics Encoder allows arbitrary vector graphics to be directly mapped to arbitrary 2-D or 3-D surfaces.

2.1 System Overview:

As noted above, the Vector Graphics Encoder described herein operates to encode vector graphic images into a cell-based collection of texel programs. These texel programs define one or more layers of geometric primitives, also referred to herein as graphics primitives, used to represent the content of each overlapping cell. The texel program for each cell is provided as a variable-length string of tokens representing a locally specialized description of graphics primitives overlapping the cell. In addition, in order to achieve any desired level of complexity, texel programs can be used to encode any number of layers of graphics primitives which can also include perlayer alpha values (for defining transparency effects for one or more primitives), per-layer color, per-layer gradients, etc.

Once a vector graphic image has been encoded into the cell-based texel programs, the texel programs are then stored for later use. For example, in one embodiment, the texel programs are evaluated within a programmable pixel shader at rendering time. Specifically, when rendering the encoded vector graphic images, the texel programs corresponding to the cells covering some region of interest of the image (i.e., all or part of the image) are interpreted at runtime within a programmable pixel shader of a graphics processing unit (GPU) to provide random access to the vector graphic image at any desired level of zoom. Note that when interpreting the texel programs, individual layers defined by each texel program are interpreted in a back to front order to determine final pixel colors for each cell. In other words, the primitives are simply stored within the texel program in a back to front order. Consequently, interpretation of the texel program in a back to front order allows a determination of overlap, occlusion, transparency effects, etc., to be made for determining pixel colors in each cell. Alternately, these primitives can also be stored in a front to back order. However, this embodiment will require reversing the order of interpretation of the texel program in order to determine proper pixel colors for the cell.

Further, in various embodiments, texel programs are packed into a memory buffer, with small regions of the image being placed into contiguous regions of memory, using either indirection tables, or a variable-size perfect hash technique. These memory packing techniques allow quicker access to specific regions of the encoded image, thereby decreasing image rendering times when providing texel programs corresponding to particular cells from the memory buffer to the GPU.

Figure 3:
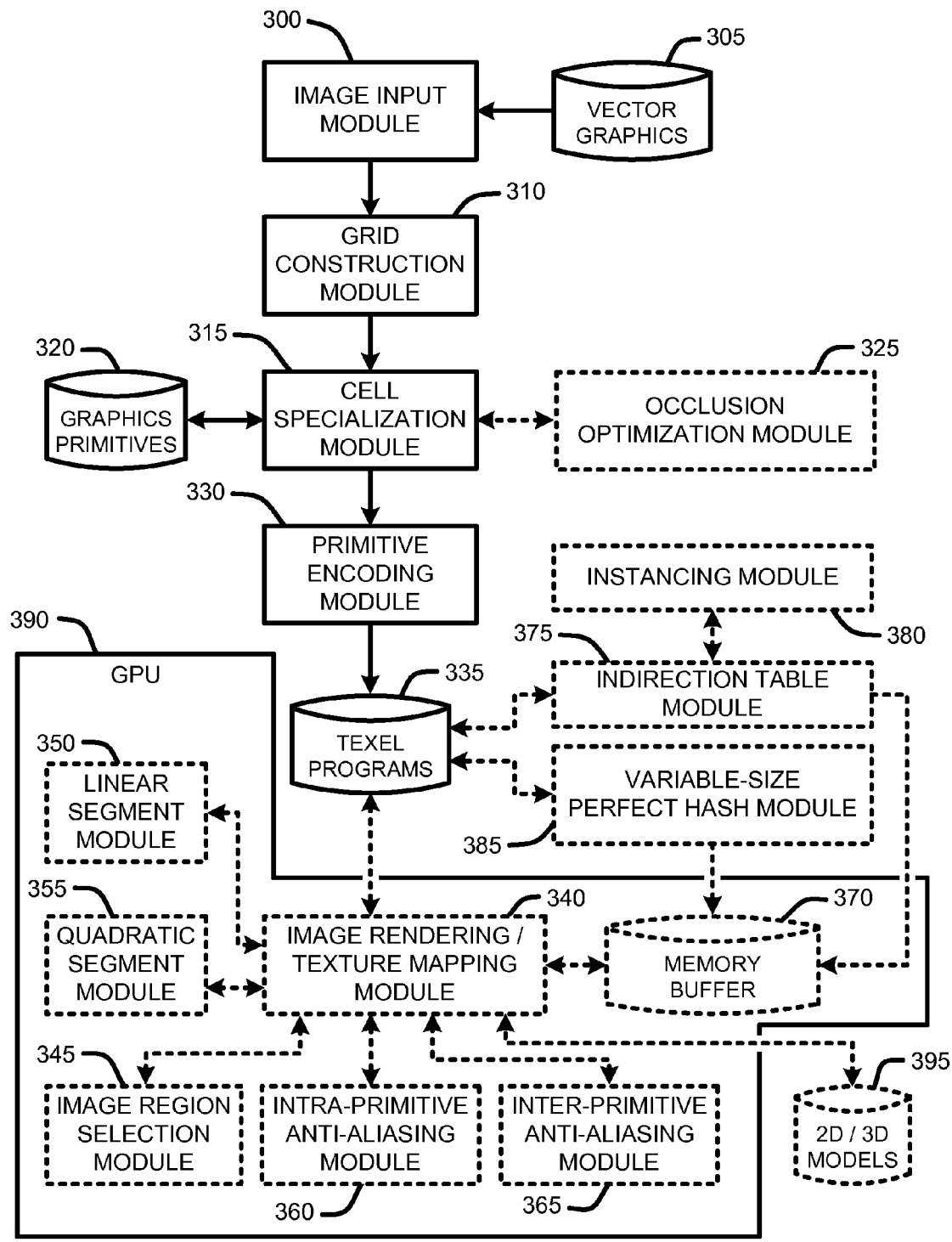
FIG. 3 provides an exemplary architectural flow diagram that illustrates program modules for implementing various embodiments and uses of the Vector Graphics Encoder, as described herein.

2.2 System Architectural Overview:

The processes summarized above are illustrated by the general system diagram of FIG. 3. In particular, the system diagram of FIG. 3 illustrates the interrelationships between program modules for implementing the Vector Graphics Encoder, as described herein. It should be noted that any boxes and interconnections between boxes that are represented by broken or dashed lines in FIG. 3 represent alternate embodiments of the Vector Graphics Encoder described herein, and that any or all of these alternate embodiments, as described below, may be used in combination with other alternate embodiments that are described throughout this document.

In general, as illustrated by FIG. 3, the Vector Graphics Encoder begins operation by using an image input module 300 to receive a vector graphics image 305. The image input module 300 then passes the vector graphics image 305 to a grid construction module 310 that constructs a coarse image grid, comprising partially overlapping cells, over the extents of the image. Note that the area of overlap of each cell defines an "extended cell" that is larger than the area of each grid cell.

A cell specialization module 320 then uses a set of pre-defined graphics primitives 320 (including stroked and filled shapes with attributes such as colors, alpha values, gradients, etc.) to construct a local graphics description specialized to each cell of the grid. In general, the cell specialization module 320 considers each cell independently, with the entire set of graphics primitives that are included in the various layers of each cell being clipped to a boundary representing the extended cell. Note that primitives are each traversed only once for each cell they overlap, and not once for every cell.

Note that the cells can be any desired size, with the size of each cell being consistent over the entire coarse grid. However, with very coarse grid resolutions, the resulting large cell size increases the number of primitives per cell, which in turn increases the per-pixel rendering cost, thus leading to slower rendering rates. Conversely, as the grid resolution becomes very fine, the majority of cells contain a single constant color, so rendering speed reaches a plateau at the cost of a larger file size resulting from more texel programs for encoding the increased number of grid cells. Further, the area of overlap representing the extended cell can also be as small or as large as desired. However, as described in further detail in Section 3.2.1, an overlap region on the order of about 10 to 20 percent of the cell size (depending on the maximum stroke width and cell size) provided good results in a tested embodiment of the Vector Graphics Encoder. Note that the complexity of each cell varies depending upon the number of primitives and layers needed to define the local graphics of each cell.

In addition, it should be noted that this overlap region is present in one or more embodiments for use in improving the quality of the anti-aliasing during rendering. For example, when applying anti-aliasing, pixels near the boundary of a graphics primitive are assigned interpolated colors. For instance, if a black primitive is rendered against a white background, the pixels near the boundary of the primitive will be rendered using different shades of gray color, depending on the fractional coverage of the primitive over the pixel. To estimate this fractional coverage, a distance of the pixel must be determined from the graphics primitive. Because of this anti-aliasing process, sometimes a pixel which lies outside a primitive is still assigned an interpolated color contributed by the primitive. Therefore, it is necessary to identify primitives which lie near a pixel even though they may not strictly cover the center of the pixel. To identify such primitives, in various embodiments, texel programs contain a larger superset of primitives intersecting the extended cell, rather than just the primitives intersecting the non-extended cell.

In one embodiment an occlusion optimization module 325 is used to reduce the complexity of individual cells. In particular, as discussed in further detail in Section 3.3.4, when the vector graphics are specialized to a cell, it is possible for the shape (i.e., the graphics primitive) within one layer to become occluded by one or more layers in front of it. Consequently, the occlusion optimization module 325 checks to see if any filled layer occludes the shapes in one or more lower layers of the cell, and if so, the occluded shapes or layers are simply removed from the texel program.

Once each grid cell has been individually specialized to identify the number of layers for each cell and the graphics primitives to be placed in each cell, a primitive encoding module 330 encodes the one or more layers of each cell into a texel program. These texel programs, one for each cell, represent an encoded version of the vector graphic image 305 that is then stored to a file or database 335 for later use. See Section 3.2 for a more detailed discussion of the contents and construction of texel programs.

In various embodiments, the texel programs 335 defining a vector graphic image 305 are then rendered by the Vector Graphics Encoder. In various embodiments, this rendering is done to either recreate the original vector graphic image 305, or to texture map that image to a 2-D or 3-D model 390 (at any desired scale).

For example, in one embodiment, the texel programs 335 defining an encoded vector graphic image 305 are provided to an image rendering/texture mapping module 340. The image rendering/texture mapping module 340 then evaluates the texel programs of cells corresponding to either a particular region of the vector graphic image 305, or to the entire vector graphic image 305 to determine individual pixel colors for each pixel of each cell. Note that the number of pixels to be rendered for each cell depends on the size of the cells, and on the level of zoom (i.e., the magnification or minification level) at which the image (or image region) is to be rendered or texture mapped. Note that in one embodiment, an image region selection module 345 is used to specify both the region of interest and the level of zoom to be used when rendering the image. In other words, the image region selection module 345 allows the image rendering/texture mapping module 340 to provide random access of the encoded vector graphic image 305 without the need to decode the entire image.

In various embodiments the image rendering/texture mapping module 340 uses a linear segment module 350 to evaluate linear primitive path segments (see Section 3.3.1) and a quadratic segment module 355 to evaluate non-linear (i.e., curved) primitive path segments (see Section 3.3.2) defined by the texel programs 335. The evaluation of the various path segments performed by the linear segment module 350 and the quadratic segment module 355 approximates pixel distances to path segments of the primitives defined by the of the texel programs of each cell. These pixel distances allow a quick determination of whether each particular pixel is on or near a particular path segment, and whether the particular pixel is inside or outside the boundaries of a stroked primitive defined by the texel programs 335, note that these distances are unnecessary for filled primitives.

In addition, in various embodiments, the pixel distances provided by the linear segment module 350 and the quadratic segment module 355 allow anti-aliasing to be performed by either an intra-primitive anti-aliasing module 360 or an inter-primitive anti-aliasing module 365, or by a combination of both of these modules for performing a joint intra- and inter-primitive anti-aliasing, as described in further detail in Section 3, with respect to FIG. 14 through FIG. 17. Note that both intra-primitive anti-aliasing and inter-primitive anti-aliasing are described in further detail in Section 3.3.3 and Section 3.3.4, respectively.

Further, as noted above, in various embodiments, texel programs are packed into a memory buffer 370 using either indirection tables, or a variable-size perfect hash technique. These memory packing techniques are able to pack the variable-sized texel programs into a concise memory structure, while still retaining efficient random access, and thus allowing low rendering times. Note that this differs from conventional techniques which allocate an array of fixed-size records that would constrain the maximum texel program complexity and result in much unused memory space.

In particular, in one embodiment, an indirection table module 375 uses an indirection table to efficiently pack the texel programs 335 into the memory buffer 370 prior to image rendering. One advantage of the use of an indirection table is that it allows an instancing module 380 to directly reuse (i.e., instancing) particular rendered primitives when possible (instead of repeatedly re-rendering the same material) by specifying offsets and/or rotations of already rendered primitives. See Section 3.4.1 for additional details regarding the use of indirection tables and instancing.

In a related embodiment, rather than using indirection tables, a technique referred to herein as variable-size perfect hashing is used to efficiently pack the texel programs 335 into the memory buffer 370 prior to image rendering. In general, a variable-size perfect hash module 385 that uses a perfect hash function that considers all possible offset vectors (starting from a random one) for packing the variable sized texel programs into memory until finding an offset vector that does not create any hash collisions. See Section 3.4.2 for additional details regarding the use of variable-size perfect hashing.

As noted above, a graphics processing unit (GPU), such as that provided on a conventional computer graphics card or the like, may be used to process the texel programs for rendering the vector graphics image. Therefore, in one embodiment, the rendering capabilities of the Vector Graphics Encoder, as described with respect to modules 340 through 370, are implemented within a GPU 390, with actual pixel rendering being provided by the pixel shader unit included in conventional GPUs.

3.0 Operation Overview:

The above-described program modules are employed for implementing the Vector Graphics Encoder. As summarized above, the Vector Graphics Encoder uses texel programs within a coarse image grid of partially overlapping cells to encode vector graphics in a randomly accessible format. This encoding format enables particular portions of encoded images to be directly accessed, at any desired level of zoom, without processing or otherwise decoding the entire image. The texel program for each cell is provided as a variable-length string of tokens representing a locally specialized description of one or more layers of graphics primitives overlapping the cell. In one embodiment, images are rendered using a programmable pixel shader of a GPU for interpreting the texel programs defining one or more cells. The following sections provide a detailed discussion of the operation of the Vector Graphics Encoder, and of exemplary methods for implementing the program modules described in Section 2 with respect to FIG. 3.

3.1 Operational Details of the Vector Graphics Encoder:

The following paragraphs detail specific operational and alternate embodiments of the Vector Graphics Encoder described herein. In particular, the following paragraphs describe details of cell-specialized vector graphics using texel programs; pixel-based rendering evaluation of graphics primitives defined by texel programs; and efficient memory storage techniques for non-uniform cells using indirection tables and variable-size perfect hashing.

3.2 Cell-Specialized Vector Graphics Using "Texel Programs":

In general, the basic idea used by the Vector Graphics Encoder for encoding vector graphics is to "specialize" the vector graphics definition in each cell of the grid covering the image to obtain compact storage and efficient runtime evaluation. In other words, the texel program defining the various layers of graphics primitives defining each cell is individually tailored to describe each individual cell. The basic shape primitive is a path consisting of linear and/or curved segments such as cubic segments or quadratic segments specified by a sequence of 2-D points, or non-uniform rational B-Spline (NURBS) segments. Note that as described herein, other attributes such as colors, alpha values, gradients, etc., can also be associated with graphics primitives. In particular, attributes such as colors, alpha values, etc., should be thought of as attributes associated with the graphics primitives. In various embodiments, these "attributes" can be stored per layer (as an optimization), or per primitive. Clearly, additional attributes can also be defined in the manner, such as, for example, gradient fills, custom miter joints between path segments, line attributes such as dash and dot patterns, etc.

Figure 4:
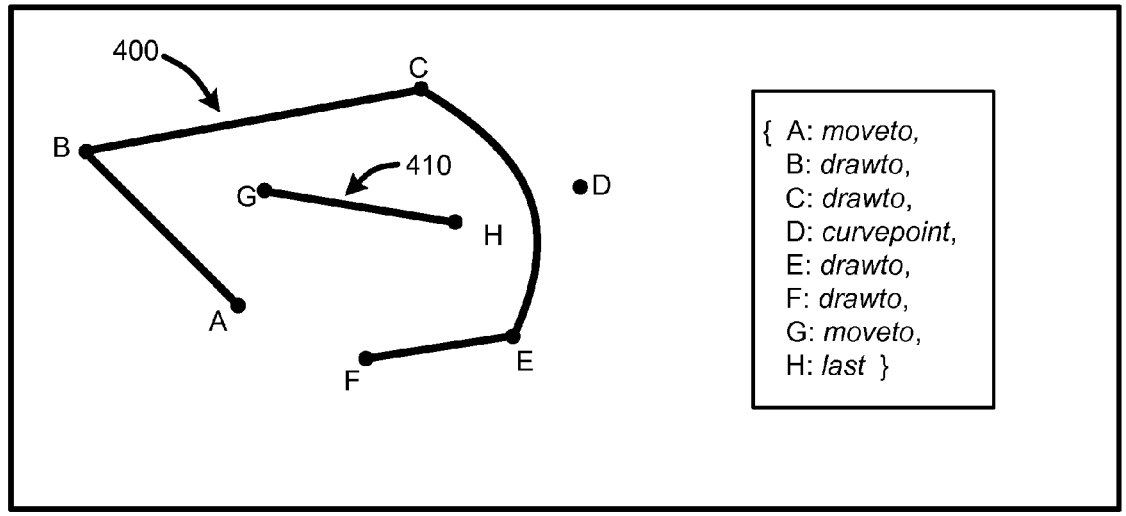
FIG. 4 provides an example of various texel program commands used to define points of primitives used to represent the contents of each grid cell for encoding vector graphics, as described herein.

Each point of the path has one of four possible "tags," including "moveto," "drawto," "curvepoint," and "last," as shown by the example provided in FIG. 4. In particular, for the path consisting of segments 400 and 410, as illustrated in FIG. 4, the path can be represented using the aforementioned tags relative to the 2-D points A through H as follows: {A: moveto, B: drawto, C: drawto, D: curvepoint, E: drawto, F: drawto, G: moveto, H: last}. In other words, the line represented by ABCEF is constructed by first moving to the coordinates of point A (i.e., A: moveto), then drawing a linear line segment to point B (i.e., B: drawto), then continuing by drawing a linear line segment to point C (i.e., C: drawto), then continuing by drawing a curved line segment from point C to point E relative to point D (i.e., D: curvepoint, E: drawto), then finishing the line by continuing from point E to point F (i.e., F: drawto).

Finally, the separate line segment of the path (i.e., segment GH) is constructed by continuing from point F by using the "moveto" tag to go from point F to point G without drawing a line (i.e., G: moveto), then continuing by drawing a linear line segment from point G to point H (i.e., G: last), where the "last" tag associated with point H indicates that it is the end of the path and that a segment will be drawn from the prior point (point G) to that last point.

Figure 5:
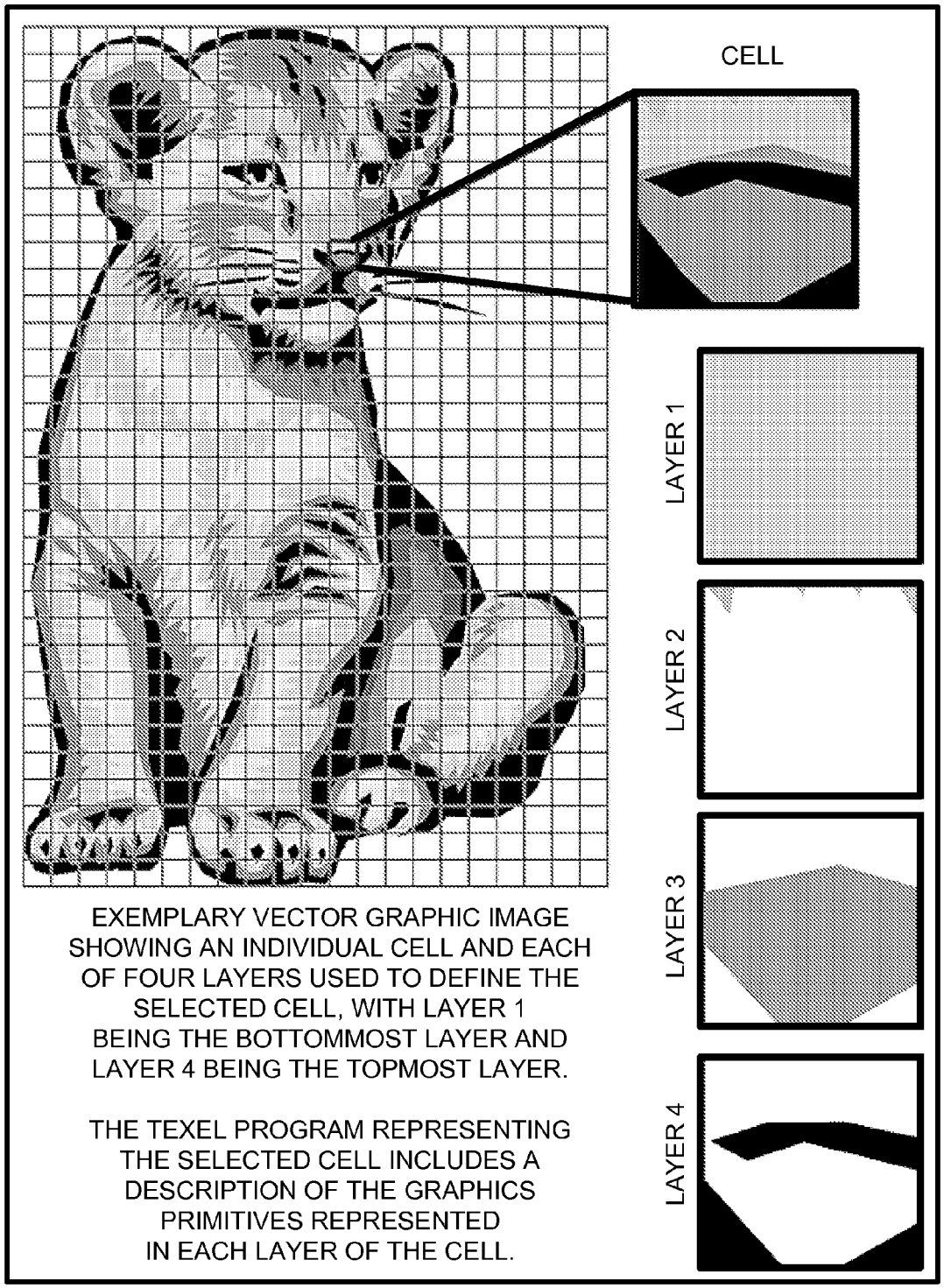
FIG. 5 illustrates an exemplary vector graphics image divided into a coarse grid, with an expanded view of one cell of the grid, and an expanded view of each of four layers of primitives used to define the illustrated cell, as described herein.

In combination, these four tags (i.e., "moveto," "drawto," "curvepoint," and "last") are sufficient to produce a path of any desired complexity from a series of 2-D points. Further, in one embodiment, the Vector Graphics Encoder adaptively approximates, with an arbitrary precision, cubic curve segments using one or more quadratic segments. Once a path is defined using 2-D points and associated tags, a "layer" is associated with the path to define a rendering state of the path, including whether it is stroked and/or filled, its color, including any transparency or gradient, and stroke width. As illustrated by FIG. 5, each complete cell consists of a back-to-front ordered list of such layers. Note that a filled path must be closed and that an adaptation of the well known even-odd "winding rule" (see Section 3.3 and discussion of FIG. 10) is used to determine whether a particular point in a given cell is inside or outside the filled portion of the path when rendering that cell based on the texel programs defining the cell.

3.2.1 Extended Cells:

The first step in creating a texel program for the one or more layers of a cell is to identify the set of graphics primitives (and alpha values for setting transparency levels) that could contribute to the rendering of any pixel falling within a given cell. There are two basic criteria for determining whether a vector primitive must be included in a cell: 1) whether a particular path is filled and its interior completely or partially overlaps the cell, and 2) whether a particular path is stroked and the stroked outline, taking the stroke width into consideration, overlaps the cell.

In addition to the two basic criteria noted above, in embodiments where anti-aliasing is applied when rendering the image, an additional criterion is used to determine whether a primitive is to be included in a cell. Specifically, when anti-aliasing is to be applied, a primitive can be included with a transparency that varies as a continuous function of the "screen-space" distance d' to the path boundary, where d' is generally some distance less than a single pixel (see Section 3.3.3), since that pixel could then contribute a blended anti-aliased color. Unfortunately, this screen-space distance varies with the runtime viewing parameters, i.e., the size of cells in screen space. As the rendered cells shrink to the size of a screen pixel, the width of the anti-aliasing ramp becomes as large as a whole cell. At extreme minification levels (i.e., a small or distant view of the image), where several cells are mapped into individual pixels, anti-aliasing breaks down, and the Vector Graphics Encoder transitions to a conventional image mipmap pyramid rather than applying either of the anti-aliasing techniques described below in Section 3.3.3 and Section 3.3.4.

Figure 6:
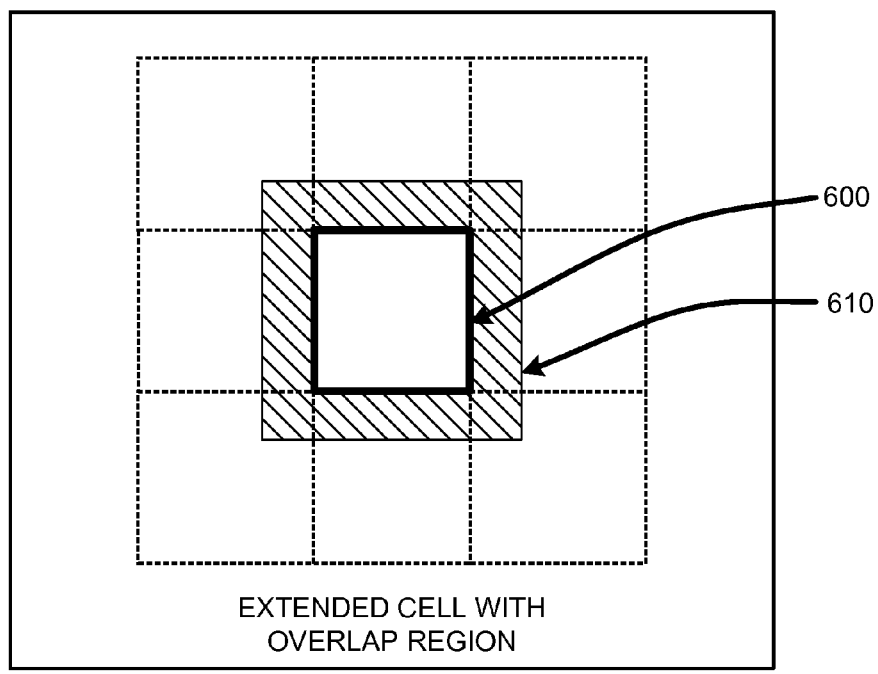
FIG. 6 provides an illustration of extended grid cells having an overlap region extending into neighboring cells, as described herein.

Since anti-aliasing is frequently used to improve image quality, the Vector Graphics Encoder avoids artifacts along cell boundaries by using primitives that overlap an extended cell as illustrated by FIG. 6. Note that FIG. 6 includes a total of 9 cells, with the center cell 600 being highlighted for purposes of explanation. In particular, as Illustrated by FIG. 6, each cell 600 includes an overlap region 610 that extends into its neighboring cells. Note that cells on the edge of the grid will not have overlap regions that extend past the end of the image unless the image is tiled such that opposite edges of the image are intended to be contiguous. In this case, the overlap of edge cells will cover the corresponding area of the corresponding cells on the opposite side of the image.

Note that the use of extended cells allows a coarser mipmap pyramid, but increases the size of the texel programs since more primitives lie in the extended cell. It has been observed that, in a tested embodiment of the Vector Graphics Encoder, depending upon maximum stroke size and cell size, a good tradeoff is to set the overlap band or region along each cell edge to be 10-20% of the cell size.

3.2.2 Cell-Based Specialization:

Conceptually, the Vector Graphics Encoder considers each cell independently, and clips the entire set of graphics primitives to the boundary of the extended cell. For stroked paths, the clipping is extremely simple, as the path is simply terminated (i.e., clipped) at the extended cell boundary. For filled paths, this clipping uses polygon clipping techniques and its straightforward extension to quadratic Bezier segments. Once clipped, the primitives are then processed using the novel texel program-based techniques described herein. Note that all point coordinates are expressed in a $[0 \ldots 1]^2$ coordinate system over the extended cell. In the rare case that a middle curvepoint Bezier control point lies outside the extended cell, we recursively subdivide the curve.

To achieve the most effective specialization of each cell, the Vector Graphics Encoder exploits knowledge of the particular rendering algorithm that is to be used to interpret the texel programs. Specifically, as noted above, interior testing is based on the use of an adaptation of the even-odd winding rule. As described in further detail in Section 3.2.3 and Section 3.3, this winding rule involves extending a ray in the +x direction from the pixel of interest, wherein enclosed regions of the path alternate between interior and exterior areas as traversed from the pixel of interest along the ray in the +x direction. Note that with respect to the winding number for a particular point or pixel, any path segment (resulting from polygon clipping) of a filled shape that lies on the top, left, or bottom boundaries of the extended cell is omitted since it has no influence on the signed distance (discussed in Section 3.3) within the cell. These winding rule concepts are further described with respect to FIG. 7 through FIG. 10 and the associated descriptions, as discussed in further detail below in Section 3.2.3 and Section 3.3.

3.2.3 Winding Numbers and Polygon Clipping Evaluations:

In general, while polygon clipping can be evaluated for all primitives and all cells, this brute force method is not computationally efficient, especially for large filled shapes. Consequently, in various embodiments, different acceleration techniques are applied to reduce computational overhead with respect to the problem of evaluating polygon clipping. For example, one acceleration technique that can be applied is to use a recursive subdivision algorithm over a quadtree of cells. However, in one embodiment, a more efficient algorithm has been implemented by the Vector Graphics Encoder that streams over the path segments of each primitives just once (rather than recursively), and directly enters each path segment into the cell(s) that the segment overlaps.

In general, this novel acceleration technique passes from one side of each cell to the other to define winding numbers for a filled shape. For example, in a tested embodiment, cell encoding follows the path boundaries, then, in post-processing, a running sum from right to left is performed for summing up the initial winding numbers to determine the winding numbers for the cell, however, so long as the direction is consistent, any direction can be used. In particular, assuming a left to right pass through each cell, and as described in further detail in Section 3.3, those points having an even winding number (including 0) are outside the filled area of the closed path, while those points having an odd winding number are inside the filled area of the closed path. Note that for filled shapes extending rightward (i.e., in the +x direction) past the extended cell boundaries, an upward path segment can be added on the right cell boundary in order to uniformly increment the winding number. Similarly, a downward segment will decrement the winding number. Unfortunately, this is a nonlocal problem, since a path may leave the cell and wander around indefinitely before finally leaving the row either upwards or downwards, or otherwise reentering the cell. Another simple example of non-local behavior is a path that does not intersect the rightmost cell boundary where for instance, a cell lies in the interior of the filled shape and so does not contain any path segments.

Therefore, to ensure correct winding numbers within cells the Vector Graphics Encoder inserts upward segments on right boundaries of the extended cells using a right-to-left sum of bottom-boundary intersections to appropriately insert the right-boundary edges. An example of these inserted boundaries is provided with respect to FIG. 7 and FIG. 8. In particular, FIG. 7 illustrates a path 700 defining the segments of a filled shape overlaying a rectangular grid of nine cells, i.e., cells 710 through 750. Note that while all nine cells include extended regions that overlap neighboring cells, as described above, for purposes of clarity, these extended regions are only illustrated by broken lines in FIG. 7 with respect to cells 710, 720, 730 and 740.

FIG. 8 illustrates an exploded version of the cells of FIG. 7 in which upward path segments have been added to the right extended cell boundary of cells 710, 715, 720, 725, 745 and 750 to maintain correct winding numbers for each of those cells by clipping the polygon outline and then fixing the winding number by including the upward and downward segments on the right cell boundary. Note that as discussed above, path segments resulting from polygon clipping of a filled shape that lie on the top, left, or bottom boundaries of the extended cell do not contribute to the winding number for that cell. Consequently, such segments resulting from polygon clipping are illustrated by broken lines in each of the cells (710 through 750) in FIG. 8. Note that while the path segments in each cell extend to the boundaries of each extended cell, the extended regions of each cell are not specifically illustrated in FIG. 8 for purposes of clarity.

In view of the preceding discussion, another way to consider the evaluation of winding numbers is that path segments crossing the right boundary of an extended cell are extended along the right edge of the cell, and for each path segment crossing the bottom of a cell, the Vector Graphics Encoder records a change, $\Delta w$, in winding number affecting all cells to the left in that row (+1 for upward segment and −1 for downward segment). Note that for efficiency, in one embodiment, connected sets of segments are preserved to avoid extraneous moveto points. Then in a fast second pass, the Vector Graphics Encoder traverses each row right-to-left, integrating the winding number changes, and for each cells with a nonzero winding number, the appropriate number of upward or downward right-boundary segments are added to determine the final winding number. The above described technique is summarized by the pseudo-code illustrated in Table 1:

TABLE 1

Winding Number Computation

```
for (each layer) {
    for (each segment in layer) {
        Enter the segment into the image cell(s) in which it overlaps,
            clipping it to the cell boundaries.
        If the segment leaves a cell through its right boundary,
            add a segment from the intersection to the top right corner.
        If the segment enters a cell through its right boundary,
            add a segment from the top right corner to the intersection.
        If the segment enters a cell through its lower boundary,
            increment Δw_c on the cell.
        If the segment leaves a through its lower boundary,
            decrement Δw_c on the cell.
    }
    for (each row of modified cells) {
        Initialize the winding number w=0 (associated with the row).
        for (each span of cells in right-to-left order) {
            Add |w| vertical segments on the right boundary of the cell,
                pointing up if w>0, or down otherwise.
            Merge the cell segments if possible.
            Update the winding number as the running sum w=w+Δw_c.
```

TABLE 1-continued

Winding Number Computation

```
        }
    }
    Clear modified Δw_c. // efficiently, using linked lists.
}
```

3.2.4 Occlusion Optimization:

When the vector graphics is specialized to a cell, it is possible for the shape within one layer to become completely occluded by one or more layers in front of it. In traditional rendering this would cause the well known problem of "overdraw." However, given that texel programs use a layered approach to specializing each cell, occluded layers in each cell are removed in one embodiment, thereby performing "dead code removal" on the texel programs defining each cell. There are a number of techniques by which occlusion testing can be performed. For example, in one embodiment, conventional polygon-polygon clipping is used to determine whether any layer is fully occluded by the union of the layers in front of it. In a tested embodiment, a simple approach is used wherein the Vector Graphics Encoder checks if any filled layer fully occludes a cell, and if so, it simply removes all of the layers behind it, thereby reducing the complexity of the texel program for the cell.

3.2.5 Compilation into Texel Program:

In one embodiment, to represent the cell-specialized graphics as a texel program, token streams are defined using a simple grammar wherein the least-significant bit of the color and point coordinates encode simple states including termination of the stream itself, as illustrated by the pseudo-code shown in Table 2:

TABLE 2

Token Stream Pseudo-Code Example

```
{TokenStream} = {Layer}+       // ordered back-to-front
{Layer} = {Color} {Point}*
{Color} = [RGBA]               // (4 bytes)
    // R,G,B,A color channels for the layer
    // the lsb of R,G,B encode:
    // - LastLayer:     is this the last layer?
    // - Stroke:    should the path be stroked?
    // - Fill:      should the path be filled?
    // !Fill && !Stroke : empty layer containing no {Point} records.
    // Stroke: color channel A encodes strokewidth.
    // Fill && Stroke: strokecolor is assumed black.
{Point} = [X Y]                // (2 bytes)
    // X,Y in extended-cell coordinates, quantized to 7 bits.
    // the lsb of X,Y encode the 4 possible
    //        point tags: moveto, drawto, curvepoint, last.
```

The two-byte Point records are packed two-at-a-time, so the texel program is a simple stream of 32-bit words. This encoding lets the same path be simultaneously filled and stroked in the common case that its stroke color is black and fill color is opaque. Note that the token stream example provided above is described only for purposes of explanation, is not intended to limit encoding of texel programs to the particular token streams described, and that any desired number of bits and any desired "grammar" can be used for such encoding.

In another embodiment, as a further optimization of texel programs, it is assumed that each layer in the texel program is implicitly prefixed by a moveto instruction to the coordinates of the lower-right corner of the cell. This assumption serves to remove the need to specify a first point for a polygon shape in a cell in many cases.

3.3 Pixel-Based Rendering Evaluation:

Most rendering algorithms for vector graphics objects traverse the graphics primitives sequentially, rasterizing each one over a frame-buffer. In contrast to these conventional approaches, the texel programs of the Vector Graphics Encoder enable the aforementioned random-access capability by, in one embodiment, directly evaluating color at any given point in each cell, as requested by a pixel shader program.

In general, this random-access capability is enabled by computing the color (including alpha, if present) contributed by each graphics layer at the current pixel and to composite these colors in back-to-front order. In related embodiments, described in detail in Section 3.3.3 and 3.3.4, more advanced techniques for computing pixel color includes techniques for evaluating intra- and inter-primitive anti-aliasing across layers in each cell.

In any case, the first step is to determine, for each layer: 1) a minimum absolute distance from the pixel being evaluated to the path of the primitive in that layer; and 2) for filled shapes, whether the pixel is in the path interior.

The distance to the path is found simply as the minimum distance to the segments of the path. To determine if the pixel lies in the path interior, the aforementioned winding number is computed by shooting a ray from the pixel to the right (+x) in texture space and summing the signed intersections with the oriented path segments (i.e., "+1" for crossing an upward pointing segment and "−1" for crossing a downward pointing segment), as illustrated in FIG. 10. The Vector Graphics Encoder then converts the absolute distance to a signed distance using the even-odd winding number rule described above.

In particular, as illustrated by FIGS. 9 and 10, and in view of the discussion provided in Section 3.2.3, winding numbers are computed as sums of oriented intersections between the ray and the path segments in each cell. For example, the FIG. 9 illustrates a self intersecting filled polygon shape 900 defining a graphics primitive contained in one cell, and showing points {A,B,C,D,E,F,G} at various coordinates throughout the cell. FIG. 10 illustrates the path segments 1000 used to define the filled polygon shape of FIG. 9, and shows the final winding number at each point {A,B,C,D,E,F,G} representing the sum of the signed intersections (i.e., "+1" for crossing an upward pointing segment and "−1" for crossing a downward pointing segment) along a ray from each point {A,B,C,D,E, F,G} in the +x direction.

For example, as illustrated FIG. 10, point A receives a winding number, $w_A$ of "0" as computed by the sum of the signed intersections given by $w_A=(-1+1)=0$. Similarly, point B receives a winding number, $w_B$ of "1" as computed by the sum of the single signed intersection given by $w_B=(+1)=1$. Point C receives a winding number, $w_C$ of "0" as computed by the sum of the signed intersections given by $w_C=(-1+1)=0$. Point D receives a winding number, $w_D$ of "2" as computed by the sum of the signed intersections given by $w_D=(+1+1)=2$. Point E receives a winding number, $w_E$ of "0" since there are no signed intersections along the ray from that point. Point F receives a winding number, $w_F$ of "0" as computed by the sum of the signed intersections given by $w_F=(+1-1)=0$. Finally, point G receives a winding number, $w_G$ of "−1" as computed by the sum of the single signed intersection given by $w_G (-1)=-1$.

Therefore, points A, C, D, E, and F, having even winding numbers (i.e., 0 or 2), are not inside the filled polygon shape, while points B and G, having odd winding numbers (i.e., 1 and −1, respectively), are inside the filled polygon shape. Note that if the direction of all of the segments of one or more discrete paths are reversed, such that the closed paths illustrated in FIG. 10 are still continuous, the winding numbers of each of the points will change from positive to negative (unless the winding number is 0) or may change value if only one of the discrete paths is reversed. However, the evenness or oddness of those numbers will not change. Consequently, the determination of whether a point is inside or outside of a filled polygon shape will not change if the direction of the path segments change. Therefore, it should be understood that the direction of the segments of a path are not critical, so long as the directions are known and are consistent in order to form the closed continuous path.

In view of the preceding discussion regarding winding numbers, the overall rendering algorithm can be summarized as illustrated by the pseudo-code provided below in Table 3:

TABLE 3

Pixel Color Rendering Process

Initialize the pixel color. // e.g. white or transparent
for (each layer) { // ordered back-to-front
   Initialize the cell winding number to 0.
   for (each segment in layer) {
      Shoot ray from pixel through segment,
         and update running sum of winding number.
      Compute absolute distance to segment,
         and update mininum absolute distance.
   }
   Assign sign to distance using winding number.
   if (fill) Blend fill color based on signed distance.
   if (stroke) Blend stroke color based on distance.
}

While there are a number of techniques for rendering graphics, conventional GPUs are designed to efficiently and quickly render images. Consequently, in one embodiment, the pixel shader of a conventional GPU is adapted for use in rendering the graphics primitives of the texel programs. In particular, the Vector Graphics Encoder interprets the token stream of the texel program and evaluates the rendering algorithm illustrated above with respect to the pixel distances and anti-aliasing described in the following sections. This interpretation accounts for the variable complexity of cells by using a set of two nested loops: a loop over layers, and a loop over point-pair tokens. Moreover, within the inner loop there is branching based on the 4 possible point tags described in Section 3.2 (i.e., moveto, drawto, curvepoint, and last).

Further, due to the SIMD parallelism inherent in modern GPU architectures, shader program execution is more efficient if nearby pixels follow the same dynamic branching path. This condition is true in the present context if the pixels are evaluated using the same texel program, i.e., if the pixels lie in the same texture cell or if adjacent cells have the same texel program (such as in areas of constant color).

3.3.1 Linear Segments:

As noted above, prior to determining a layer's contribution to the final pixel color two pieces of information must be determined: 1) an absolute distance from the pixel being evaluated to the boundary of the path in that layer; and 2) for filled shapes, whether the pixel is in the path interior. The second of these two items is determined as discussed above with respect to the winding number of particular points. The first of the two items, i.e., the absolute distance, is computed as described below, depending upon whether the path segment in question is linear or curved.

Figure 11:
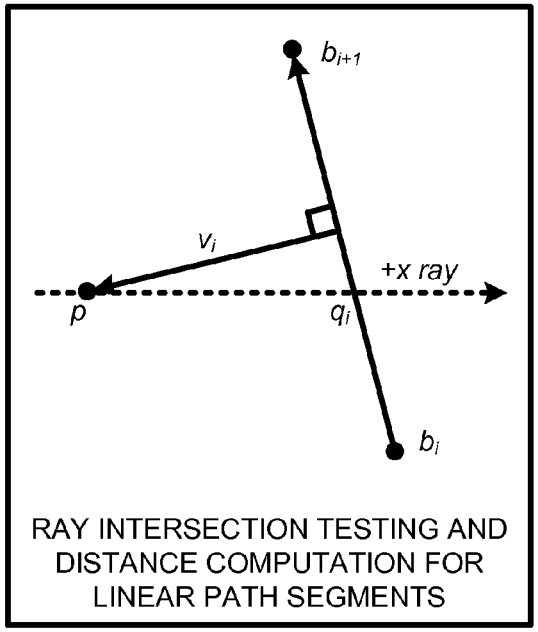
FIG. 11 provides an illustration of ray intersection testing and distance computation for linear path segments of an arbitrary shape, as described herein.

In the case of a linear path segment, the signed distance from pixel p to the path segment is computed as illustrated by FIG. 11 which illustrates ray intersection testing and distance computation for linear path segments. In particular, given a pixel p and linear segments $\{(b_1, b_2), (b_2, b_3), \ldots\}$, the Vector Graphics Encoder computes the signed distance d as follows: For each segment $(b_i, b_{i+1})$, the Vector Graphics Encoder finds the sign of the intersection $w_i$ ($\pm 1$, or zero if none), where this signed intersection is illustrated as point $q_i$ in FIG. 11, and the distance vector $v_i$ is illustrated by Equation 1, where:

$$t_i = \frac{p_y - b_{i,y}}{b_{i+1,y} - b_{i,y}}, \quad \text{Equation 1}$$

$$q_i = lerp(b_i, b_{i+1}, t_i) = (1 - t_i)b_i + t_i b_{i+1},$$

$$w_i = \begin{cases} \text{sign}(b_{i+1,y} - b_{i,y}), & 0 \le t_i \le 1 \text{ and } q_{i,x} > p_x \\ 0, & \text{otherwise,} \end{cases}$$

$$t'_i = \text{clamp}\left(\frac{(p - b_i) \cdot (b_{i+1} - b_i)}{(b_{i+1} - b_i) \cdot (b_{i+1} - b_i)}, 0, 1\right),$$

$$v_i = p - lerp(b_i, b_{i+1}, t'_i)$$

where "lerp" stands for linear interpolation, and where clamp (x,0,1) is meant to represent the function that returns 0 if x<0, 1 if x>1, and x otherwise.

In principle the Vector Graphics Encoder can also handle the degenerate case of the ray passing through a vertex. However, an evaluation of tested embodiments of the Vector Graphics Encoder has demonstrated that this particular condition occurs infrequently. Consequently while visible artifacts may result from the case where the ray passes through a vertex, in the case of a moving or dynamic image or scene, such artifacts would disappear very quickly.

Finally, the Vector Graphics Encoder combines the results of all segments as illustrated by Equation 2, where:

$$w = \sum_i w_i, \text{ and} \quad \text{Equation 2}$$

$$d = (-1)^{windingrule(w)} \min_i \|v_i\|$$

Figure 12:
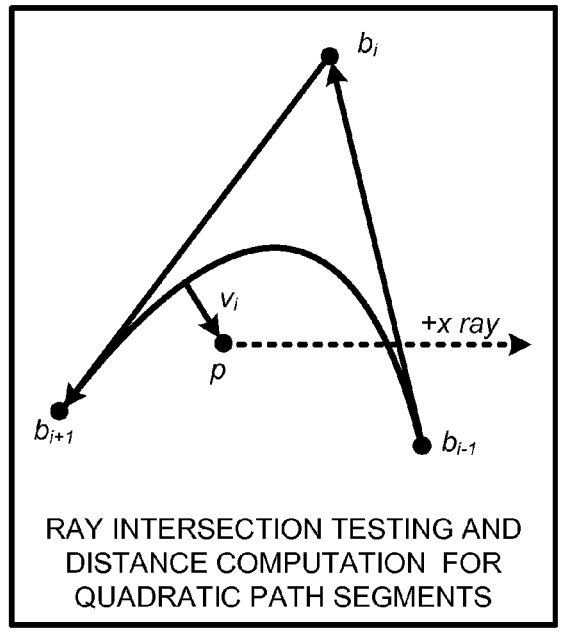
FIG. 12 provides an illustration of ray intersection testing and distance computation for quadratic path segments for an arbitrary shape, as described herein.

3.3.2 Quadratic Segments:

Unlike linear segments, a quadratic segment is defined by three points, $(b_{i-1}, b_i, b_{i+1})$, where point $b_i$ is tagged as a "curvepoint," for defining a Bezier curve $b(t)=(1-t)^2 b_{i-1} + 2(1-t)t b_i + t^2 b_{i+1}$ over $0 \le t \le 1$. In this case, the Vector Graphics Encoder computes the signed distance from pixel p as shown in FIG. 12, which illustrates ray intersection testing and distance computation for quadratic path segments.

In particular, the intersection points of the ray from pixel p with the (infinite) quadratic curve are found at the roots $t_1, t_2$ of the quadratic equation $b_y(t)=p_y$, where it is assumed that $t_1 \le t_2$. A root $t_j$ (with j=1 or j=2) corresponds to an intersection point on the curve if $0 \le t_j \le 1$. The orientation of the curve at an intersection point $b(t_j)$ is determined from the vertical direction $b'_y(t_j)$ of its tangent vector as illustrated by Equation 3, where:

$$b'(t_j) = \frac{db(t)}{dt}\bigg|_{t=t_j} = 2(b_i - b_{i-1})(1 - t) + 2(b_{i+1} - b_i)t \quad \text{Equation 3}$$

For each root $t_j$, the Vector Graphics Encoder checks whether $0 \le t_j \le 1$ and whether $b_x(t_j) > p_x$, and, if so, the Vector Graphics Encoder reports an intersection with orientation $w_i = \text{sign}(b'_y(t_j))$.

Note that the quadratic equation $b_y(t)=p_y$ becomes linear if the parabola axis is horizontal, i.e. $b_{i,y} = \frac{1}{2}(b_{i-1,y} + b_{i+1,y})$. However, one simple solution to avoid having to test this condition at runtime is to (imperceptibly) perturb the point $b_i$ by some very small amount, such as one bit, during encoding.

As is known to those skilled in the art, directly computing the absolute distance to a quadratic Bezier curve involves finding the roots of a cubic polynomial. While such techniques can be used by the Vector Graphics Encoder, analytic roots are computationally expensive to evaluate. Consequently, in a related embodiment, the Vector Graphics Encoder reduces computational overhead by using a conventional iterative solver to converge on the roots.

In yet another related embodiment, a novel fast approximate technique based on "implicitization" is used to determine the roots. In particular, the Vector Graphics Encoder first converts the Bezier curve to its implicit quadratic representation, given by the "Sylvester" form of its resultant as illustrated by Equation 4, where:

$$f(p) = \beta(p)\delta(p) - \alpha^2(p) = 0, \text{ with} \quad \text{Equation 4}$$

$$\beta(p) = 2\text{Det}(p, b_{i+1}, b_i), \delta(p) = 2\text{Det}(p, b_i, b_{i-1}), \text{ and}$$

$$\alpha(p) = -\text{Det}(p, b_{i+1}, b_{i-1}), \text{ and } \text{Det}(p, q, r) = \begin{vmatrix} p & q & r \\ 1 & 1 & 1 \end{vmatrix}$$

The first-order Taylor expansion of f(p)=0 at p defines a line, and the closest point p' to p on this line is then given by Equation 5, where:

$$p' = p - \frac{f(p)\nabla f(p)}{\|\nabla f(p)\|^2} \quad \text{Equation 5}$$

For p' exactly on the curve, the Vector Graphics Encoder can then find the parameter t' such that b(t')=p' by inversion. In the quadratic Bezier case, inversion can be obtained by Equation 6, where:

$$t' = \frac{u'_j}{1 + u'_j}, \text{ with either } u'_1 = \frac{\alpha(p')}{\beta(p')} \text{ or } u'_2 = \frac{\delta(p')}{\alpha(p')} \quad \text{Equation 6}$$

In fact, if p' lies on the curve, the resultant vanishes, and $u'_1 = u'_2$. Since this is generally not the case, the two values differ, and the Vector Graphics Encoder must rely on an approximation. In one embodiment, this approximation is determined by Equation 7, where:

$$\bar{u} = \frac{\alpha + \delta}{\beta + \alpha} \text{ which gives } \bar{t} = \frac{\alpha + \delta}{(\beta + \alpha) + (\alpha + \delta)} \quad \text{Equation 7}$$

Note that $\bar{t}$ is exact whenever p' is on the curve. The biggest advantage of $\bar{t}$, however, is that it is continuous, even when p' coincides with one of the control points (where $u'_1$ or $u'_2$ become undefined).

The Vector Graphics Encoder then computes the distance vector, $v_i$, as illustrated by Equation 8, where:

$$v_i = p - b(\text{clamp}(\bar{t}, 0, 1))$$ Equation 8

Although there are cases in which this clamping produces the wrong endpoint, in practice, it has been observed that the clamping provides a sufficiently good approximation, especially when p is a small distance away from the curve. Further, it should be noted that clamping is only one possible source of error, and that then entire process is an approximation, even if the clamping is not required.

Note that implementation of the formulas described above is much simpler if the Bezier points b are translated so as to place p (and resp. p') at the origin.

3.3.3 Intra-Primitive Anti-Aliasing:

From the texture-space signed distance d, the Vector Graphics Encoder knows whether a particular pixel lies within the interior of a filled path and/or within half a stroke width of a stroked path. This information allows the Vector Graphics Encoder to perform intra-primitive anti-aliasing, as described in the following paragraphs.

In particular, for filled paths, the Vector Graphics Encoder transforms the texture-space distance d into a screen-space distance d' for isotropic anti-aliasing using d'=d/σ where σ=max($\|J_x\|, \|J_y\|$) and the 2×2 matrix J is the screen-to-texture Jacobian reported by pixel shader derivative instructions. Therefore, each graphics layer successively modifies the color c computed at the pixel using box filtering to provide the blend operation illustrated in Equation 9, where:

$$c = \text{lerp}(c, \text{fillcolor}, \alpha) \text{ with } \alpha = \text{clamp}(d' + 0.5, 0, 1)$$ Equation 9

Note that blending based on a box filter kernel is provided as an example only, and that the Vector Graphics Encoder can make use of other filter kernel types, if desired.

In a closely related embodiment, the Vector Graphics Encoder applies anisotropic anti-aliasing using conventional techniques by transforming each texture-space distance vector $v_i$ to screen space (using the inverse of the same Jacobian matrix J) and measuring its magnitude there, as illustrated by Equation 10, where:

$$v'_i = J^{-1} v_i$$
$$d' = (-1)^{windingrule(w)} \min_i \|v'_i\|$$ Equation 10

Figure 13:
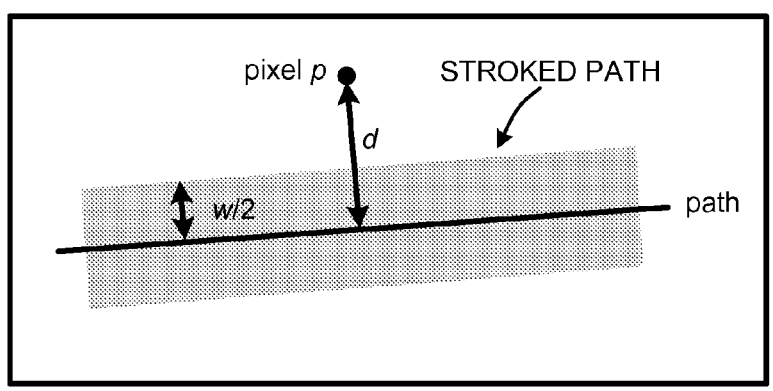
FIG. 13 provides an illustration of an evaluation of sub-pixel distances for use in intra-primitive anti-aliasing of stroked paths, as described herein.

In contrast to filled paths, the problem with respect to stroked paths is slightly more complicated. Specifically, since the stroke width w is expressed in texture units, the Vector Graphics Encoder must consider the distance d before its transformation to screen coordinates. Also, thin strokes may have width less than one pixel. Therefore, as illustrated by FIG. 13, for isotropic anti-aliasing, the blending operation is performed in accordance with Equation 11, where:

$$c = \text{lerp}(c, \text{strokecolor}, \alpha), \text{ with}$$ Equation 11
$$\alpha = \text{clamp}\left(\left(|d| + \frac{w}{2}\right)/\sigma, -0.5, 0.5\right) - \text{clamp}\left(\left(|d| - \frac{w}{2}\right)/\sigma, -0.5, 0.5\right)$$
$$= \text{clamp}\left(\left(|d| + \frac{w}{2}\right)/\sigma, 0.5, 0, 1\right) - \text{clamp}\left(\left(|d| - \frac{w}{2}\right)/\sigma + 0.5, 0, 1\right)$$

For paths that are both filled and stroked, Vector Graphics Encoder performs two successive blend operations, first with the fill, and next with the stroke in order to determine final pixel color. Note also that strokes can be implemented by converting them to filled primitives.

3.3.4 Inter-Primitive Anti-Aliasing:

The anti-aliasing described in Section 3.3.3 (using signed distance to the path) is inexact because the resulting linear blend corresponds to an infinite line at the closest point of the path. However, in practice, the path can have more complex local geometry including corners. Further, the intra-primitive anti-aliasing described in Section 3.3.3 is computed per shape primitive, so it ignores inter-primitive interactions.

Correct anti-aliasing requires considering all the shapes overlapping each pixel. One conventional anti-aliasing approach in traditional rasterization schemes is the use of a conventional "A-buffer" which maintains per-pixel lists of fragments, with each fragment containing a sub-pixel bit-mask. Unfortunately, this general solution is challenging to implement efficiently in hardware.

In various embodiments, the Vector Graphics Encoder addresses this anti-aliasing problem using a different approach. Specifically, since texel programs encode the list of relevant vector primitives (on the current surface), as illustrated by FIG. 14, the Vector Graphics Encoder provides a novel approach for evaluating and combining colors for a pixel p' 1410 within an extended cell 1420 within a k×k grid of sub-pixel samples 1430 (k=4 in this example), without any added bandwidth to provide the desired inter-primitive anti-aliasing. Note that in FIG. 14, pixel p' 1410 is represented by a solid dot, while the k×k grid of sub pixel samples 1430 is represented by a set of 16 (i.e., 4×4) smaller unfilled circles.

The first step in this inter-primitive anti-aliasing approach is to determine the footprint 1500 of the pixel p 1510 in texture space as illustrated by FIG. 15. Note that in FIG. 14 the symbol p' 1410 is meant to denote pixel position in screen space, while the symbol p 1510 is used in FIG. 15 to denote the same pixel position in texture space. In other words, p' 1410 and p 1510 represent the coordinates of the same point in two different spaces (p in texture space, and p' in screen space). Similarly, sub-pixel samples 1530 represent texture space versions of the sub-pixel samples 1430 of FIG. 14. The footprint 1500 is determined using the same techniques as applied in conventional anisotropic texture filtering processes. This footprint can overlap several regular grid cells, which would require parsing of multiple texel programs. However, the Vector Graphics Encoder uses extended cells that include an overlap of each neighboring cell, as described above. Consequently, the overlap region of the extended cells is set to be large enough (typically in the 10 to 20 percent overlap range, as noted above) to provide a sufficient margin so that only the current cell needs to be considered. One the other hand, at extreme minification levels, a pixel footprint can become larger than the overlap region of the extended cell. In this case, the Vector Graphics Encoder simply transitions to a conventional mipmap process for rendering the requested view.

Assuming that the texture-space footprint is within the boundaries of the extended cell, the Vector Graphics Encoder begins inter-primitive anti-aliasing operations by evaluating a k×k grid of samples within a parallelogram footprint $$\left\{p + Jv \left| -\frac{3}{4} \le v_x, v_y \le \frac{3}{4}\right.\right\},$$

and blends them using a cubic filter. The Vector Graphics Encoder parses the cell texel program just once, updating all samples as each primitive is decoded. This requires allocating a few temporary registers per sample (accumulated color c, accumulated winding w, and shortest distance vector $v_i$).

Then, for each sub-pixel sample, the Vector Graphics Encoder still evaluates the intra-primitive anti-aliasing described above in Section 3.3.3, but with a modified Jacobian matrix $$J' = \frac{3}{2k} J$$

to account for the modified inter-sample spacing. Note that, as with the entire rendering pipeline, this evaluation can be performed using either the programmable pixel shader of a GPU, or by software emulation of the pixel shader using other CPUs or GPUs. Clearly, the use of a hardware-based pixel shader rather than the use of software emulation will generally improve rendering performance.

FIG. 16 illustrates an example of effect of inter-primitive anti-aliasing, both with and without the intra-primitive anti-aliasing described in Section 3.3.3, for various sub-sampling rates (e.g., k=1, 2, or 4 in the examples provided in FIG. 16). Note that the text samples illustrated in FIG. 16 are not intended to be legible or readable, and are provided only for illustrating anti-aliasing effects. In particular, example 1610 of FIG. 16 illustrates a text sample with no anti-aliasing for k=1, while example 1615 of FIG. 16 illustrates the same text sample anti-aliased using only intra-primitive anti-aliasing for k=1. Example 1620 of FIG. 16 illustrates the same text sample anti-aliased using only inter-primitive anti-aliasing for k=2, while example 1625 of FIG. 16 illustrates the same text sample anti-aliased using both inter-primitive anti-aliasing and intra-primitive anti-aliasing for k=2. Finally, example 1630 of FIG. 16 illustrates the same text sample anti-aliased using only inter-primitive anti-aliasing for k=4, while example 1635 of FIG. 16 illustrates the same text sample anti-aliased using both inter-primitive anti-aliasing and intra-primitive anti-aliasing for k=4.

The overall rendering algorithm with inter-primitive anti-aliasing is summarized by the pseudo-code shown below in Table 4:

TABLE 4

Rendering with Inter-Primitive Anti-Aliasing

```
for (each sample) {
    Initialize the sample color (e.g. to white or transparent).
}
for (each layer) {        // ordered back-to-front
    for (each sample) {
        Initialize the sample winding number to 0.
        Initialize the sample minimum absolute distance to 0.
    }
    for (each segment in layer) {
        for (each sample) {
            Shoot ray from sample through segment, and update
                running sum of winding number for sample.
            Compute absolute distance to segment, and update
                minimum absolute distance for sample.
        }
    }
    for (each sample) {
        Assign sign to sample distance using sample winding number.
        if (fill): Blend fill color over sample color based on sample
            signed distance.
        if (stroke): Blend stroke color over sample color based on
            sample absolute distance.
    }
}
Combine the resulting sample colors to obtain the pixel color.
```

In various closely related embodiments, several improvements to the above-described inter-primitive anti-aliasing approach are used to improve overall anti-aliasing performance. For example, in one embodiment, both the number and distribution of samples is adapted to the extents of the computed footprint, as in anisotropic texture filtering. In another embodiment, the sampling density (e.g., the value of k) is automatically adapted to the complexity of each cell. This value of k is either computed and included in the texel program when the vector graphic is originally encoded, or computed at rendering time. In yet another embodiment, multiple samples share the same texture y value to allow reuse of horizontal intersection points. Finally, in still another embodiment, since the footprints overlap in screen space, some samples can be shared between pixels, so long as the capability is allowed by the GPU hardware, or implemented in the software emulation.

Figure 17:
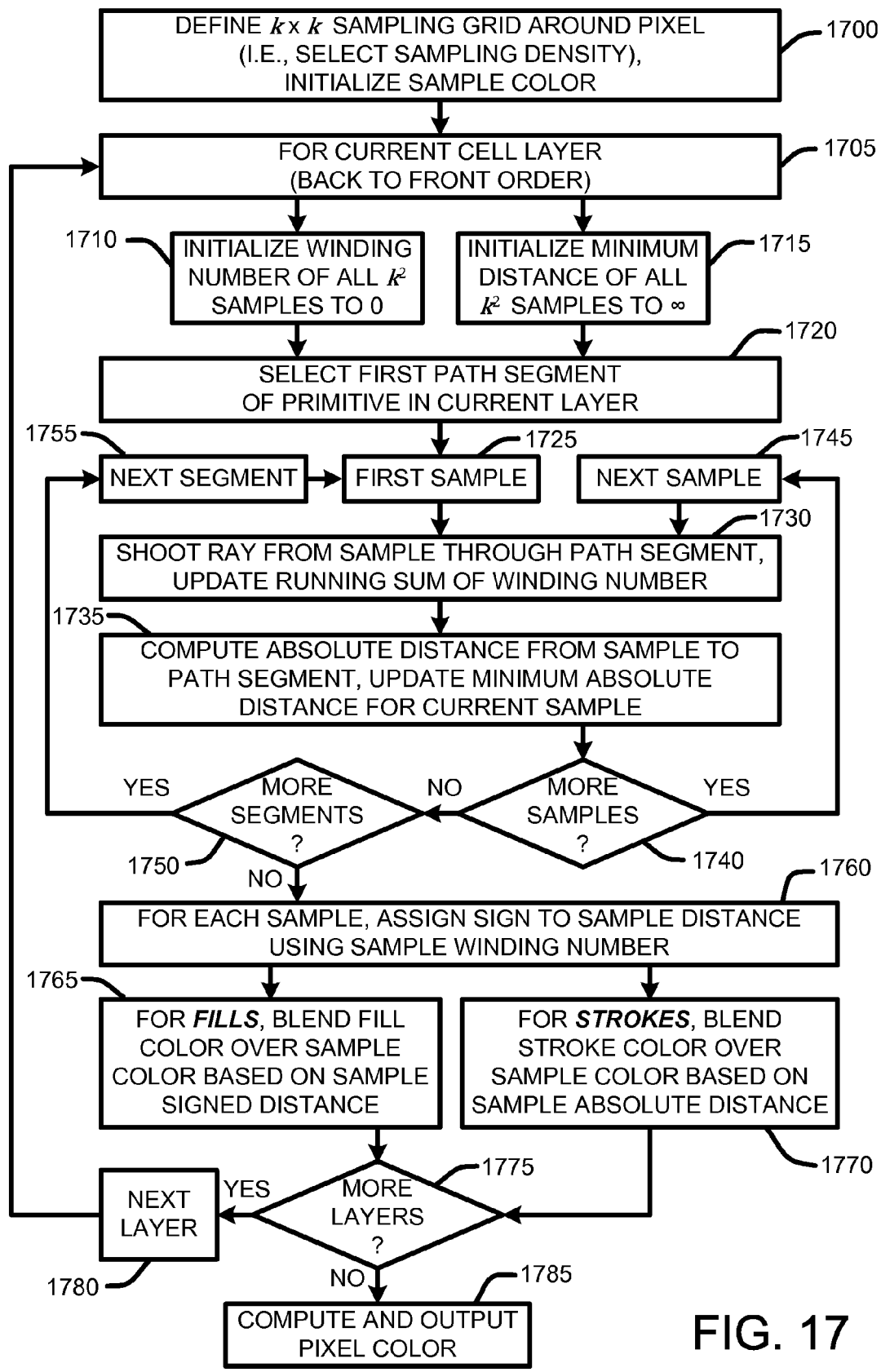
FIG. 17 illustrates an exemplary operational flow diagram for implementing inter-primitive anti-aliasing, as described herein.

The processes described above with respect to inter-primitive anti-aliasing are generally illustrated with respect to the operational flow diagram of FIG. 17. In particular, FIG. 17 illustrates determining pixel color for a selected pixel within a particular extended cell using the inter-primitive anti-aliasing techniques described above.

The process begins by first defining 1700 the sampling grid size for super-sampling based anti-aliasing. In particular, the size of the k×k grid of sub-pixel samples surrounding the selected pixel is first defined, while at the same time, setting an initial color value for the pixel, generally white or transparent. Next, the inter-primitive anti-aliasing process continues, beginning with the first cell layer 1705 (assuming the back to front layer order described above.

For the current layer, the winding number of each of the $k^2$ samples of the k×k grid is initialized 1710 to 0. In addition, the minimum distance value of each of the $k^2$ samples is initialized 1715 to ∞ (or some very large number). Once these initializations (1710 and 1715) are performed, the next step is to determine winding numbers for each of the samples. This winding number determination begins by selecting 1720 a first path segment of the primitive in the current layer of the cell, and shooting 1730 a ray from the current sample through the current path segment and determining a resulting winding number for that ray, as described above.

Next, an absolute distance from the current sample is computed 1735 to the current path segment, with this value then being used to update the minimum absolute distance for the current sample. If there are more samples 1740 (depending on the value of k), then the process described above (steps 1730 and 1735) is repeated for the next sample 1745 until all samples have been processed. Once all samples have been processed for the current segment of the path of the primitive in the cell, a determination 1750 is made as to whether there are more segments in the path.

If there are more segments in the path, then the segment is advanced to the next segment 1755, and the process described above (steps 1730, 1735, 1740, and 1745) is repeated for all segments of the primitive's path until all segments of the path have been processed with respect to every sample in the sampling grid.

Once all of the segments have been processed for the current layer of the extended cell containing the pixel being evaluated, then a sign is assigned 1760 to each of the final minimum sample distances (iteratively computed in step 1735) based on the final sum of the winding numbers computed for each sample (see step 1730).

Then, if the pixel being evaluated is being anti-aliased with respect to a filled primitive, the pixel color is determined for the current layer by blending 1765 the fill color of the primitive over the current sample color (e.g., initially white or transparent for the first layer), for each of the sub-pixel samples, based on the signed distance for each of those samples. Alternately, if the pixel being evaluated is being anti-aliased with respect to a stroked primitive, the pixel color is determined for the current layer by blending 1770 the stroke color of the primitive over the current sample color (e.g., initially white or transparent for the first layer), for each of the sub-pixel samples, based on the minimum absolute distance for each of those samples.

Then, a determination 1775 is made as to whether there are more layers, the layer is incremented 1780, and the process described above (steps 1707 through 1775) are repeated for each layer, to continue the iterative blending of the current pixel color (1765 or 1770) depending on whether the primitive is filled or stroked until there are no more layers to process. Once all layers of the cell in which the selected pixel resides have been processed, as described above, then the color for that pixel is computed and output 1785 as the inter-primitive anti-aliased color for that pixel. Final pixel color is computed here by averaging together the sub-pixel sample colors. A straightforward averaging corresponds to a box filter. Alternatively, a spatially weighted averaging can be used to correspond to a more general spatial filter.

3.4 Storage of Non-Uniform Cells:

As noted above, one of the advantages of the texel programs used to define each cell is that they are variable-length, thereby allowing cells to have varying levels of complexity. Consequently, this variable length should be considered when developing a data structure for packing the texel programs of an encoded vector graphics image into memory. In one embodiment, this packing is performed using an indirection table, along with optional instancing. In another embodiment, this packing is performed using a technique referred to herein as "variable-size perfect hashing." Note that in each case, the token strings of each texel program are self-terminating, so it is unnecessary to store their sizes explicitly.

In general, the indirection tables described below better preserve data coherence and allow instancing of texel programs, while the variable-size perfect hash described below is more concise in the case of sparse data.

3.4.1 Indirection Table and Instancing:

In one embodiment, one simple solution packing the token strings of the texel programs into memory is to simply concatenate the token strings in raster-scan order into a memory buffer, using a 2-D indirection table to contain pointers to the start of each of the strings. Note that in one embodiment, cells with identical strings can share the same string instance to improve rendering performance. Optionally, this "instancing" is only performed for row-adjacent cells to preserve memory coherence. For larger datasets, a two-level indirection process is used wherein a first pointer is used to identify the start of each image row, and an offsets used to identify the start of each string within the row. Note that the offset is added to the first pointer, with the intent being that this offset can have smaller precision (e.g., 16 bits compared to the 32-bit first pointer).

In one embodiment, this 2-D indirection process is implemented storing data in 2-D textures using an internal tiling structure (optimized for 2-D coherence), such that the 1-D token strings become fragmented in memory. This process allows efficient packing of the strings into the 2-D texture using a greedy best-fit heuristic. However, this type of packing requires modifying the order of the token strings, which results in further loss of memory coherence.

With respect to instancing, texel programs can be extended to contain references to auxiliary shared data. For instance, vector graphics often contain repeated instances of smaller graphic elements, such as font characters on a page. For example, even within a single sentence, the letter "e" may appear multiple times. Consequently, describing the outline of the letter "e" repeatedly can result in a significant memory cost. Depending upon cell size, an individual cell, and its corresponding texel program, may contain several characters, each with its own relative position within the cell. Consequently, it is generally unlikely that two different cells will share exactly the same texel program.

Instead, an instancing process is included directly in the texel program itself for 1) identifying a separately stored vector graphics, and 2) adjusting the position (and possibly rotation and scale) of that vector graphic within the current cell. With this instancing mechanism, for a page of text, the texel program would contain instancing references to the characters in a font. Then given these references to the appropriate substring of tokens, the Vector Graphics Encoder simply splices in the appropriate substring of tokens into the current texel program, along with any necessary translation or transform of the (x,y) coordinates for properly incorporating the already rendered, and separately stored vector graphic instance into the final rendered image.

3.4.2 Variable-Size Perfect Hashing:

Some vector graphics objects are quite sparse and do not translate well to the use of indirection tables because many cells will be empty and the indirection table must still contain pointers for all these empty cells. Consequently, in another embodiment, the indirection tables described in Section 3.4.1 are repacked with a "variable-size perfect hash function." In general, the variable-size perfect hash function identifies undefined cells of the domain using a domain bit image which requires only a single bit per cell. However, unlike the data typically processed using conventional perfect hash functions, the data records (token strings) of the texel programs are variable-sized and therefore stored as variable length strips or strings in the hash table.

In particular, let s(c) denote the strip size of cell c. Then, the hash, h(c), is defined using a 2-D offset table $\phi$, as illustrated by Equation 12, where:

$$h(c)=(c+\phi[c \bmod r]) \bmod m \qquad \text{Equation 12}$$

where r and m are the dimensions of the offset and hash tables respectively.

The construction of the offset table $\phi$ uses the same heuristic strategy as conventional perfect hashes. In particular, offset vectors $\phi[q]$ are assigned in order of decreasing number of dependent data elements. However, unlike conventional perfect hashes, rather than counting the number $|h_1^{-1}(q)|$ of dependent data records, where $h_1(c)=c \bmod r$, the Vector Graphics Encoder instead counts the total data size $\Sigma_{c \in h_1^{-1}(q)} s(c)$ of the dependent records.

Then, to assign $\phi[q]$, the Vector Graphics Encoder considers all possible offset vectors (starting from a random one) until finding one that does not create any hash collisions. One improvement to this process is to promote placing strips adjacent to each other by first finding an invalid offset vector and then looking for the first valid offset.

Note that the concept of variable-size perfect hashing is described in greater detail in the copending U.S. patent application Ser. No. 11/763,279, entitled "PERFECT HASHING OF VARIABLY-SIZED DATA" by Hugues Hoppe, and filed on Jun. 14, 2007.

The foregoing description of the Vector Graphics Encoder has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Vector Graphics Encoder. It is intended that the scope of the invention be limited not by this detailed description, but rather by the claims appended hereto.

What is claimed is:

1. A process for encoding a vector graphics image, comprising:
   receiving a vector graphic image;
   constructing a grid comprising a plurality of cells over the extents of the vector graphic image;
   for each cell, constructing an arbitrary number of layers, each layer comprising an arbitrary number of graphics primitives of arbitrary complexity, for defining a portion of the vector graphics image corresponding to the extents of each cell; and
   encoding the layers and corresponding graphics primitives of each cell into a texel program corresponding to each cell, and storing the texel programs to a computer readable storage medium.

2. The process of claim 1 further comprising selectively decoding the texel programs corresponding to one or more cells to render a selected region of the vector graphics image corresponding to one or more specific grid cells.

3. The process of claim 2 wherein rendering a selected region of the vector graphics image comprises texture mapping the selected region of the vector graphics image to a 3-D model.

4. The process of claim 2 wherein boundaries of each cell partially overlap each immediately neighboring cell, thereby transforming each cell of the grid into an extended cell.

5. The process of claim 4 wherein rendering the selected region of the vector graphics image further comprises performing cell-based intra-primitive anti-aliasing based on the texel programs of each extended cell for determining pixel color for each pixel in each grid cell.

6. The process of claim 4 wherein rendering the selected region of the vector graphics image further comprises performing cell-based inter-primitive anti-aliasing based on the texel programs of each extended cell for determining pixel color for each pixel in each grid cell.

7. The process of claim 2 further comprising using a variable-size perfect hash for efficiently packing the stored texel programs into a memory buffer of a GPU prior to rendering the selected region of the vector graphics image.

8. A computer-readable storage medium having computer executable instructions stored therein for encoding a vector graphic image in a randomly accessible format, said computer executable instructions comprising:
   receiving a vector graphic image;
   constructing a coarse grid having a uniform cell size over the extents of the vector graphic image;
   for each cell, identifying an arbitrary number of layers of arbitrarily complex graphics primitives sufficient to defining a content of each cell relative to a corresponding region of the vector graphic image;
   encoding the layers of graphics primitives of each cell into a variable length string of tokens for each cell; and
   storing the variable length string of tokens corresponding to each cell for use in randomly accessing a selected portion of the vector graphic image.

9. The computer-readable storage medium of claim 8 further comprising determining, for each cell, whether any layer of graphics primitives fully occludes any lower layer of graphics primitives, and eliminating any fully occluded layers prior to encoding the layers of graphics primitives of each cell into the variable length string of tokens for each cell.

10. The computer-readable storage medium of claim 8 wherein randomly accessing the selected portion of the vector graphic image comprises:
    identifying an arbitrary region of the vector graphic image to be rendered;
    identifying the grid cells correspond to the identified region of the vector graphic image;
    traversing the layered graphics primitives of each cell corresponding the identified grid cells to determine a contribution of each graphics primitive to a final pixel color for each pixel in each identified grid cell; and
    rendering each pixel of each identified grid.

11. The computer-readable storage medium of claim 10 wherein rendering each pixel of each identified grid cell further comprises texture mapping the selected portion of the vector graphic image to a model.

12. The computer-readable storage medium of claim 10 wherein rendering each pixel of each identified grid cell further comprises:
    computing an absolute distance from each pixel in each grid cell to one or more graphics primitives in the corresponding cell; and
    performing intra-primitive anti-aliasing for each pixel based on the computed absolute distances for each pixel.

13. The computer-readable storage medium of claim 12 wherein computing the absolute distance from each pixel in each grid cell to one or more graphics primitives in the corresponding cell comprises approximating a distance from one or more pixels to a quadratic curve.

14. The computer-readable storage medium of claim 10 wherein rendering each pixel of each identified grid cell comprises evaluating the variable length string of tokens corresponding to each cell within a programmable pixel shader of a GPU for determining a color of each pixel of each identified grid cell.

15. A method for encoding vector graphic images, comprising using a computing device to:
    evaluate a vector graphic image to identify an arbitrary number of layered sets of arbitrarily complex graphics primitives corresponding to each of a grid of partially overlapping cells covering extents of the vector graphics image;
    for each partially overlapping cell constructing a variable length string of tokens corresponding to a texel program for defining the layered sets of graphics primitives corresponding to each partially overlapping cell; and
    encoding the vector graphics image by storing the texel program for each partially overlapping cell to a computer readable storage medium.

16. The method of claim 15 further comprising rendering a selected region of the encoded vector graphics image by:
    evaluating the variable length string of tokens of the texel programs corresponding to each of a plurality of the partially overlapping cells corresponding to the selected region of the vector graphics image; and
    determining a color for each pixel of each partially overlapping cell based on the evaluation of each corresponding texel program.

17. The method of claim 16 wherein determining a color for each pixel of each partially overlapping cell further comprises performing an inter-primitive anti-aliasing evaluation of each pixel for use in determining a final pixel color.

18. The method of claim 16 wherein rendering a selected region of the encoded vector graphics image further comprises texture mapping the selected region of the encoded vector graphics image to an arbitrary geometric model.

19. The method of claim 16 wherein rendering a selected region of the encoded vector graphics image further comprises using an indirection table for efficiently packing the stored texel programs into a memory buffer of a GPU prior to rendering the selected region of the encoded vector graphics image.

20. The method of claim 16 wherein rendering a selected region of the encoded vector graphics image further comprises using a variable-size perfect hash for efficiently packing the stored texel programs into a memory buffer of a GPU prior to rendering the selected region of the encoded vector graphics image.

* * * * *